US010178699B2

(12) United States Patent
Lei et al.

(10) Patent No.: US 10,178,699 B2
(45) Date of Patent: Jan. 8, 2019

(54) RANDOM ACCESS ENHANCEMENT BASED ON SCALABLE SIGNATURE DESIGN

(71) Applicant: QUALCOMM Incorporated, San Diego, CA (US)

(72) Inventors: Jing Lei, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/488,737

(22) Filed: Apr. 17, 2017

(65) Prior Publication Data

US 2018/0070381 A1 Mar. 8, 2018

Related U.S. Application Data

(60) Provisional application No. 62/384,588, filed on Sep. 7, 2016.

(51) Int. Cl.
*H04W 74/08* (2009.01)
*H04L 1/00* (2006.01)
*H04L 27/26* (2006.01)

(52) U.S. Cl.
CPC ........ *H04W 74/0833* (2013.01); *H04L 1/004* (2013.01); *H04L 27/26* (2013.01)

(58) Field of Classification Search
CPC ............. H04W 74/004; H04W 74/008; H04W 74/0833; H04L 1/004; H04L 27/26
See application file for complete search history.

(56) References Cited

U.S. PATENT DOCUMENTS

| 2004/0264550 | A1* | 12/2004 | Dabak | H04B 1/707 |
| | | | | 375/142 |
| 2007/0298824 | A1* | 12/2007 | Ostman | H04J 13/00 |
| | | | | 455/522 |
| 2011/0292816 | A1* | 12/2011 | Lee | H04W 16/24 |
| | | | | 370/252 |

FOREIGN PATENT DOCUMENTS

EP 2 114 031 A2 11/2009
WO WO-2013/126858 A1 8/2013

OTHER PUBLICATIONS

Fujitsu: "Transmission of NPRACH on a Non-Anchor NB-IoT PRB", 3GPP Draft; R2-165176, 3rd Generation Partnership Project (3GPP), Mobile Competence Centre, 650, Route Des Lucioles, F-06921, Sophia-Antipolis Cedex, France, vol. RAN WG2, No. Gothenburg, Sweden; Aug. 21, 2016, XP051126783, Retrieved from the Internet: URL:http://www.3gpp.org/ftp/Meetings_3GPP_SYNC/RAN2/Docs/ [retrieved on Aug. 21, 2016], 3 pages.

(Continued)

*Primary Examiner* — Eric Myers
(74) *Attorney, Agent, or Firm* — Arent Fox LLP

(57) ABSTRACT

Various aspects described herein relate to techniques for random access based on scalable signature design in wireless communications systems. A method, a computer-readable medium, and an apparatus are provided. In an aspect, the method may include randomly choosing an array of source symbols, wherein the array has one or more scalable dimensions based on at least one of a capacity requirement or a coverage requirement of a random access channel (RACH), encoding the array of source symbols into a codeword for a RACH signature, mapping the codeword to a serial concatenation of orthogonal or quasi-orthogonal sequences to define the RACH signature, and transmitting the RACH signature within a RACH slot. The techniques described herein may apply to different communications (Continued)

technologies, including 5th Generation (5G) New Radio (NR) communications technology.

30 Claims, 17 Drawing Sheets

(56) References Cited

OTHER PUBLICATIONS

Ijaz A., et al., "Enabling Massive IoT in 5G and Beyond Systems: PHY Radio Frame Design Considerations", IEEE Access, vol. 4, Aug. 22, 2016, pp. 3322-3339, XP011617699, DOI:10.1109/ACCESS. 2016.2584178 [retrieved on Jul. 21, 2016].
International Search Report and Written Opinion—PCT/US2017/045048—ISA/EPO—dated Nov. 7, 2017. (15 total pages).
Pratas N.K., et al., "Code-Expanded Random Access for Machine-Type Comnunications", IEEE Globecom Workshops (GC WKSHPS 2012): Anaheim, California, USA, IEEE, Piscataway, NJ, Dec. 3, 2012, pp. 1681-1686, XP032341638, DOI: 10.1109/GLOCOMW. 2012.6477838, ISBN: 978-1-4673-4942-0.

* cited by examiner

| RACH Format Index | $T_{CP}$ [µs] | $T_{SEQ}$ [µs] | $T_G$ [µs] | Overhead $\frac{T_{CP}+T_G}{T_{SEQ}}$ | Multipath Delay Spread [µs] | PRACH TTI [µs] | Cell Coverage [km] |
|---|---|---|---|---|---|---|---|
| 0 | 103.13 | 800 | 96.88 | 25% | 6.25 | 1000 | 14.5 |
| 1 | 684.38 | 800 | 515.63 | 150% | 16.67 | 2000 | 77.3 |
| 2 | 203.13 | 1600 | 196.88 | 25% | 6.25 | 2000 | 29.5 |
| 3 | 684.38 | 1600 | 715.63 | 87.5% | 16.67 | 3000 | 100.2 |

FIG. 2

| $k$ (RACH Symbol Index) | 0 | 1 | 2 | 3 | 4 | 5 | 6 |
|---|---|---|---|---|---|---|---|
| $u_k$ (Root Index) | 129 | 140 | 120 | 210 | 168 | 84 | 105 |
| $\Delta_k$ (Initial Offset) | 0 | 29 | -31 | 43 | -59 | 61 | -79 |
| Range of Cyclic Shifts | {0, 104, 208, 312, 416, 520, 624, 728} | {29, 133, 237, 341, 445, 549, 653, 757} | {808, 73, 177, 281, 385, 489, 593, 697} | {43, 147, 251, 355, 459, 563, 667, 771} | {780, 45, 149, 253, 357, 461, 565, 669} | {84, 188, 292, 396, 500, 604, 708, 812} | {760, 25, 129, 233, 337, 441, 545, 649} |
| $N_{cs}$ (Step Size of Cyclic Shift) | 104 ||||||||
| $N_{zc}$ (ZC Seq. Length) | 839 ||||||||

RANDOM ACCESS ENHANCEMENT BASED ON SCALABLE SIGNATURE DESIGN

CROSS-REFERENCE TO RELATED APPLICATION

This application claims the benefit of U.S. Provisional Application Ser. No. 62/384,588, entitled "RANDOM ACCESS ENHANCEMENT BASED ON SCALABLE SIGNATURE DESIGN" and filed on Sep. 7, 2016, which is expressly incorporated by reference herein in its entirety.

BACKGROUND

Aspects of the present disclosure relate generally to wireless communications systems, and more particularly, to techniques for random access based on scalable signature design in wireless communications systems (e.g., 5G New Radio).

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method of wireless communication related to random access of a wireless communication channel is based on a scalable signature design in a wireless communications system. The method includes randomly choosing an array of source symbols, wherein the array has one or more scalable dimensions based on at least one of a capacity requirement or a coverage requirement of a random access channel (RACH), encoding the array of source symbols into a codeword for a RACH signature, mapping the codeword to a serial concatenation of orthogonal or quasi-orthogonal sequences to define the RACH signature, and transmitting the RACH signature within a RACH slot.

In an aspect, an apparatus for wireless communication related to random access of a wireless communication channel is based on a scalable signature design in a wireless communications system. The apparatus may include a transmitter, a receiver, a memory, and/or one or more processors communicatively coupled to the transmitter, the receiver, and the memory. The one or more processors are configured to perform the operations of methods described herein. In an aspect, for example, the apparatus for wireless communications may include a transmitter, a memory configured to store instructions, and at least one processor communicatively coupled to the transmitter and the memory, wherein the at least one processor is configured to execute the instructions to: randomly choose an array of source symbols, wherein the array has one or more scalable dimensions based on at least one of a capacity requirement or a coverage requirement of a random access channel (RACH), encode the array of source symbols into a codeword for a RACH signature, map the codeword to a serial concatenation of orthogonal or quasi-orthogonal sequences to define the RACH signature, and transmit, via the transmitter, the RACH signature within a RACH slot.

In another aspect, an apparatus for wireless communication related to random access of a wireless communication channel is based on scalable signature design in a wireless communications system is provided. For example, the apparatus for wireless communications may include means for randomly choosing an array of source symbols, wherein the array has one or more scalable dimensions based on at least one of a capacity requirement or a coverage requirement of a random access channel (RACH), means for encoding the array of source symbols into a codeword for a RACH signature, means for mapping the codeword to a serial concatenation of orthogonal or quasi-orthogonal sequences to define the RACH signature, and means for transmitting the RACH signature within a RACH slot.

In a further aspect, a computer-readable medium (e.g., a non-transitory computer-readable storage medium) is provided including code executable by one or more processors for wireless communication related to random access of a wireless communication channel based on a scalable signature design in a wireless communications system. For example, the computer-readable medium may store code executable by at least one processor to execute instructions to randomly choose an array of source symbols, wherein the array has one or more scalable dimensions based on at least one of a capacity requirement or a coverage requirement of a random access channel (RACH), to encode the array of source symbols into a codeword for a RACH signature, to map the codeword to a serial concatenation of orthogonal or quasi-orthogonal sequences to define the RACH signature, and to transmit, via a transmitter, the RACH signature within a RACH slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

FIG. 2 is a table of example dimensions of Long Term Evolution (LTE) Physical Random Access Channel (PRACH) preambles, according to one or more of the presently described aspects.

DETAILED DESCRIPTION

Figure 1:
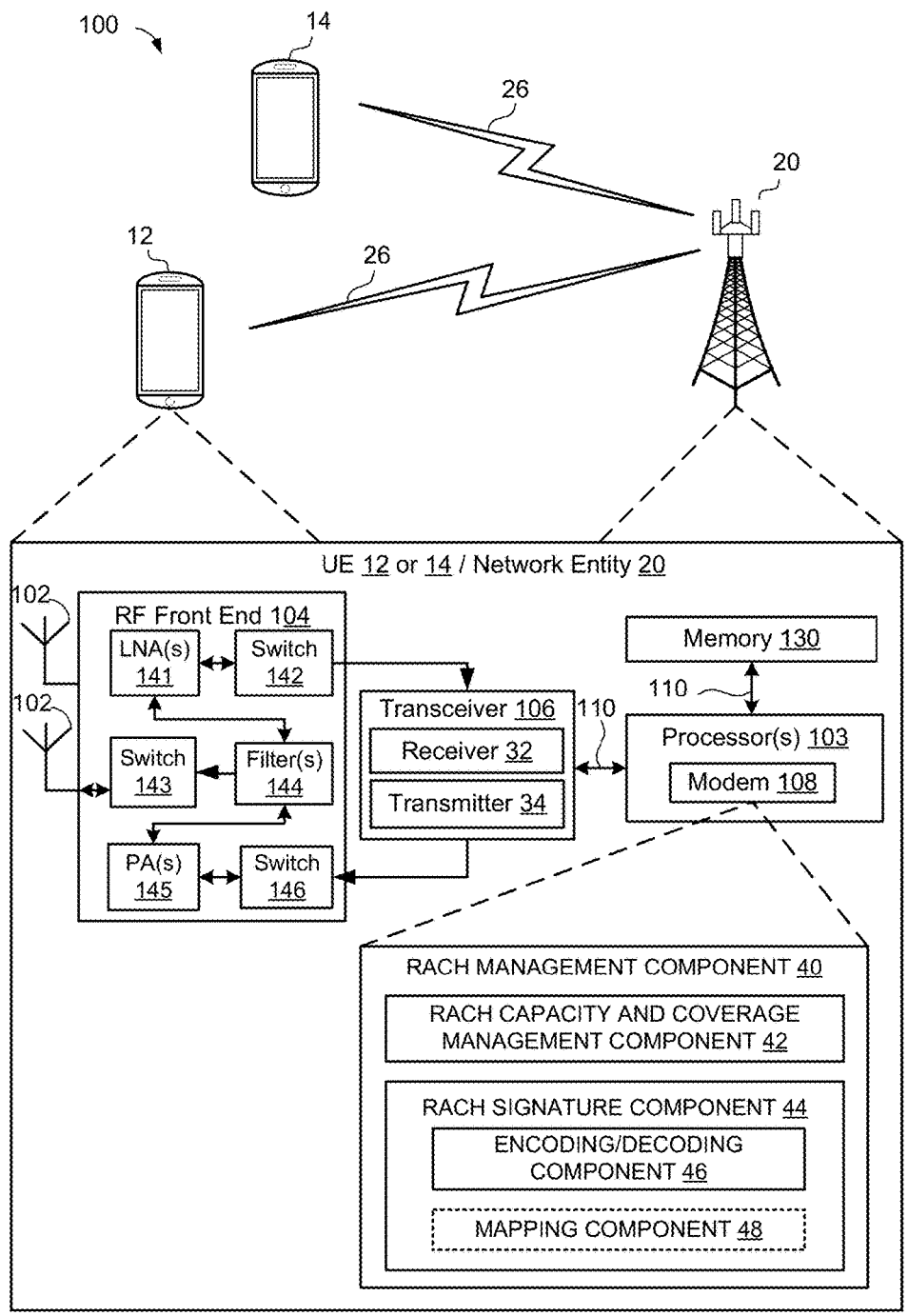
FIG. 1 is a block diagram of an example communications network including at least one network entity in communication with one or more user equipment configured to perform random access according to one or more of the presently described aspects.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity, and support for massive numbers of internet of things (IoT) devices, new approaches may be desirable to improve coverage and capacity of random access, transmission efficiency, and to simplify implementation (e.g., backward compatibility), in order to satisfy consumer demand and improve user experience in wireless communications (e.g., 5G NR).

Random access procedures in a wireless communications system allow a common radio channel to be dynamically and opportunistically shared by a population of users (UEs). A conventional cellular network may lack native support for concurrent random access by massive numbers of internet of things (IoT) devices. For example, some conventional networks (e.g., an LTE network) have been designed to support high data rates on downlink communications, however, the capacity of random access in these conventional networks may be limited by the use of a relatively small number of orthogonal or quasi-orthogonal random access preambles. In other words, in a conventional cellular network that utilizes 64 random access preambles, the capacity of random access in these conventional networks may be limited to 64 users since each user may use one of the 64 preambles. In another example, preamble-only transmission(s) may not fully exploit all available degrees of freedom because the preambles use uncoded sequences (e.g., without parity symbols and/or other potentially advantageous coding designs). In some examples, collisions of random access requests may occur when different UEs transmit the same preamble on the same random access (RA) slot. Additionally, in some conventional networks, contention resolution is used to avoid random access collisions, but it incurs large latency and signaling overheads.

Furthermore, in some cases, conventional Physical Random Access Channel (PRACH) design for a wireless communications system (e.g., an LTE system) may rely on large or long Cyclic Prefix (CP) and guard interval to make sure the worst user(s) (e.g., one or more cell-edge users) is orthogonal to all other users. The use of a large CP and guard interval may lead to large overhead and/or low energy efficiency, and may also limit the PRACH capacity, e.g., limited to 64 users per transmission time intervals (TTI).

In existing enhancements to random access operations, the 3rd Generation Partnership Project (3GPP) provides some solutions to address the above noted limitations, for example, dedicated access slots for Machine-Type Communications (MTC) devices, access class barring for different MTC applications and priorities, dynamic allocation of Random Access Channel (RACH) resources, and/or adjustment of back-off timers. In some examples, the back-off timers are used for distribution among a number of UEs with random delays, and the adjustment of these back-off timers may be a passive solution.

In other existing random access enhancements, a UE-centric, grant-less access based on the ALOHA communication scheme (hereinafter "ALOHA") is proposed. For example, in some platforms, an end device may trigger uplink transmissions based on chirp spread spectrum, and two downlink slots (e.g., ACK and UE-ID) with a programmable resource index are linked to each uplink transmission.

In another category of random access solution based on code slotted ALOHA, transmission schemes such as code multiple access (CMA), sparse code multiple access (SCMA), or irregular repetition slotted ALOHA (IRSA), have been proposed. However, practical implementation of these proposals has some issues. For example, a reliable "pointer" design is non-trivial and may incur more overhead; in addition, design of multiple low rate forward error correction (FEC) codebooks may be needed. As a result, the energy efficiency and bandwidth efficiency is low, which is not desirable for devices with resource constraints.

In a further example of existing random access enhancements, using resource spread multiple access (RSMA) is proposed. However, the processing with RSMA is relevantly complicated since RSMA is based on code division multiple access (CDMA) and low rate binary FEC codebooks, which is prone to near-far effects and requires iterative exchange of extrinsic information between an interference canceller and a FEC decoder.

Despite the above-noted enhancements, improvements to random access in wireless communications may be desired. For example, improvement to random access may be desired to support massive numbers of IoT devices (e.g., in a 5G New Radio system), where both coverage and capacity of random access may need to be improved. As used herein, the term coverage includes the geographic area served by a base station, e.g., the geographic area ("coverage area") or distance ("coverage distance") over which the transmissions from the base station may be received by other devices (e.g., one or more UEs), and/or the geographic area ("coverage area") or distance ("coverage distance") over which transmissions from the other devices may be received by the base station. Further, in other cases, both transmission efficiency and implementation complexity may need to be considered with respect to random access. Additionally, in some cases, backward compatibility of random access procedures (e.g., reuse of pre-defined sequences/waveforms) may have some benefits for the simplified implementation of 5G transceivers. Therefore, new or improved random access channel (RACH) design(s) and procedure(s) may be desirable. In addition, the re-use of existing RACH/PRACH preambles is also desirable.

Figure 5:
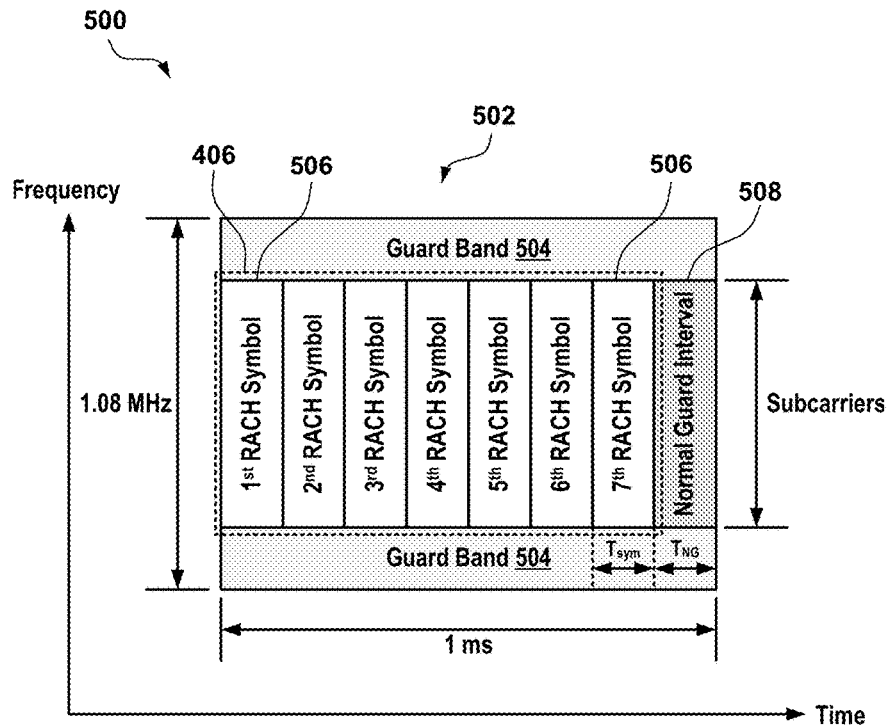
FIG. 5 is a block diagram of an example frame structure of a RACH signature format for normal cell coverage, according to one or more of the presently described aspects.
Figure 5:
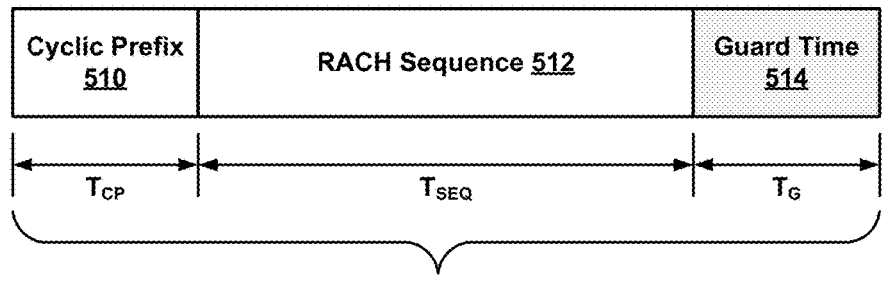
Figure 6:
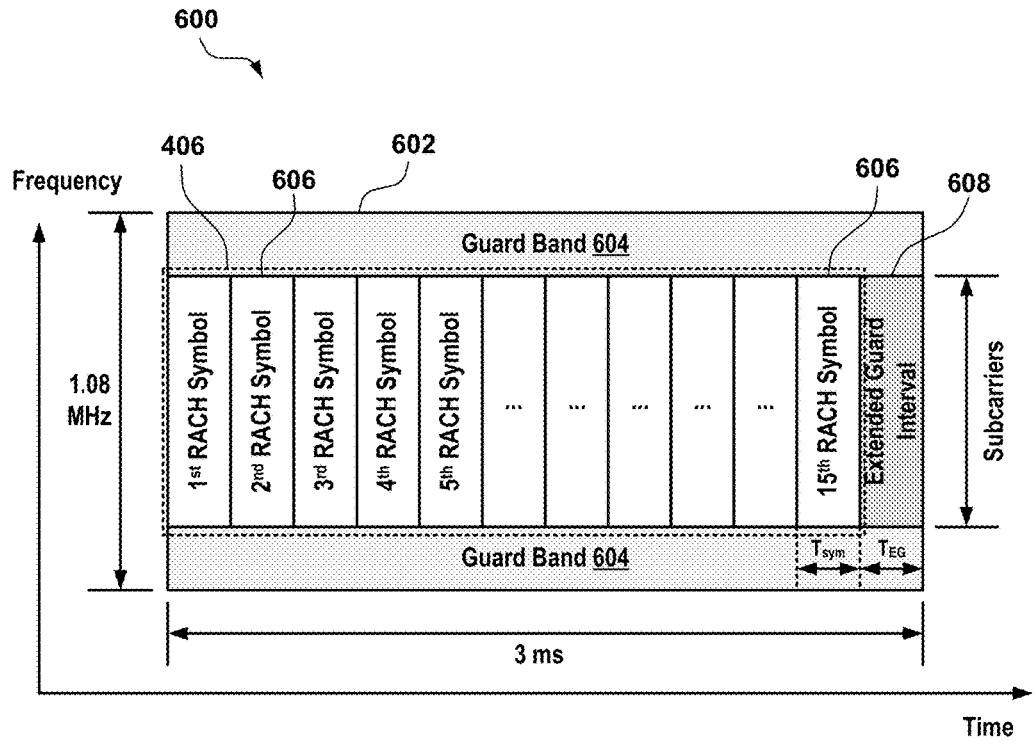
FIG. 6 is a block diagram of an example frame structure of a RACH signature format for extended cell coverage, according to one or more of the presently described aspects.
Figure 6:
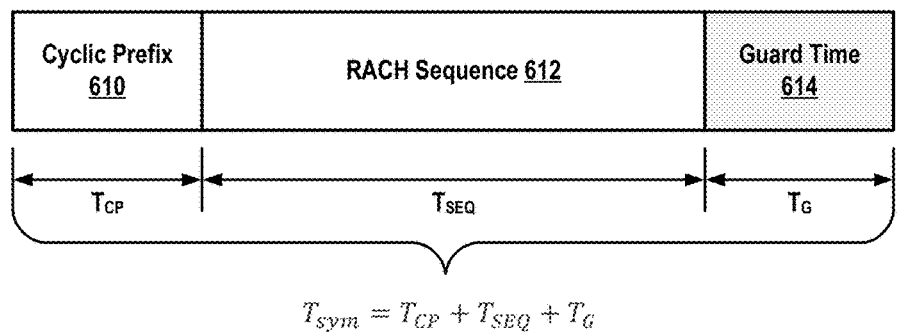

The present disclosure provides apparatus and methods that may improve one or more aspects of random access in a wireless communication system. For instance, to increase the PRACH capacity (e.g., 64 users per TTI in an LTE system) and/or coverage, the present aspects may configure a RACH signature or a RACH slot format for RACH transmissions with flexibility and scalability. For example, scalable parameters in the design space may include, but are not limited to, one or more of the duration of the TTI (e.g., from 1 ms to 3 ms), the number of RACH symbols in a RACH signature (e.g., from 7 symbols to 15 symbols), the time duration of each RACH symbol and/or the RACH signature, the length of the guard interval, the length of the codeword, the size of the codebook and/or the code rate, the cyclic prefix (e.g., as shown in FIG. 5 and FIG. 6), the transmission power, bandwidth, and/or subcarrier spacing used for the PRACH channel. In some aspects, one or more of the scalable design parameters discussed herein may be selected, scaled up or down, or determined based on specific requirements of the coverage and/or capacity of random access and/or resource constraints. In some aspects of the degrees of freedom that may be exploited for a scalable PRACH channel and/or signature design, one or more of the parameters discussed herein (e.g., a CP length, a codeword length, a codebook size and/or code rate, guard time length, value of transmit power, time duration of a RACH slot and/or time duration of entire RACH signature, etc.) may be used or selected dynamically. The flexibility and scalability of the RACH design may allow the wireless communications system to adjust accordingly based on the desired coverage (e.g., cell radius) or PRACH capacity (e.g., a desired number of users per TTI).

The detailed description set forth below in connection with the appended drawings (e.g., FIGS. 1-15) is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to a wireless communications system (e.g., an LTE system or a 5G New Radio system), in particular, techniques for random access based on scalable random access channel (RACH) signature design, for example, using an enhanced code structure in RACH signature/sequence design, and/or advanced receiver processing (e.g. interference cancellation at base stations, PRACH sequences collision allowance). In some aspects, with the scalable signature design, the coverage and/or the capacity of random access may be increased and enhanced. In some examples, with the scalable signature design and/or the enhanced random access, cyclic prefix (CP) overhead can be reduced by allowing non-orthogonal PRACH and leveraging successive interference cancellation (SIC) at a receiver. In some implementations, the scalable signature design may include mapping a codeword, symbol-by-symbol, to a respective sequence designed with auto-correlation and/or cross-correlation properties. In some examples, the waveform selection or reselection may re-use existing LTE preamble sequences. In some examples, the radio resources may be fit into different time interval(s) (e.g., 1 ms, 2 ms, or 3 ms) and/or a 1.08 MHz frequency bandwidth.

In some aspects related to scalable RACH signature design, a UE may randomly choose an array of source symbols (e.g., systematic part of encoded, non-binary symbols) from an alphabet of finite size for RACH transmissions. For instance, the array of source symbols may include a subset of a number of symbols selected from a set of available source symbols (e.g., an "alphabet") configured to generate a RACH signature. In some examples, RACH requests from different UEs may be distinguished by the use of different source symbols. In some examples, the dimension of source symbols and size of alphabet may depend on the desired capacity of random access (e.g., a RACH). In some examples, the source symbols are encoded into a codeword. In an aspect, a codeword is a stream of data that contains information to be transmitted through a physical channel (e.g., a PRACH). In an example, 3 or 5 source symbols are encoded into a codeword with a length of 15. In another example, 3 source symbols are encoded into a codeword with a length of 7, which may be considered as a relatively short codeword (e.g., short in length) as compared with the codeword having a length of 15.

In some aspects, the codeword may be chosen from or use short-length erasure codes with a maximum distance separable (MDS) property. In an aspect, an erasure code may be a FEC code for a binary erasure channel, which transforms a message of k symbols into a longer message (e.g., a codeword) with n symbols such that the original message may be recovered from a subset of the n symbols. In another aspect, for example, a short-length erasure code may refer to a codeword with a relatively small size, which is generated from the codebook of erasure codes and the entries in the codebook have a short length.

In some examples, the length of the codeword may at least partially or mainly depend on a desired coverage of random access (e.g., RACH). In some examples, the codeword may be mapped symbol-by-symbol to a serial concatenation of orthogonal or quasi-orthogonal sequences. Symbol-to-sequence mapping may be a function of symbol index and/or a cell identifier (ID). In some examples, the symbol-to-sequence mapping using symbol index(s) and/or cell ID(s) may minimize inter-symbol correlation of asynchronous reception, and/or reduce inter-cell interference (ICI) of dense network deployments. In some examples, only a limited variety of symbol-to-sequence mapping is allowed and defined for a given cell, and adjacent or neighbor cells may employ different symbol-to-sequence mapping(s).

In some examples of the RACH signature design, each RACH signature may be transmitted within one RACH slot, and each RACH signature may correspond to a codeword of length K (the number of RACH symbols within one RACH slot, e.g., as shown in Table 1). Each RACH slot may comprise K RACH symbols (e.g., source symbols) plus a guard interval, where the kth RACH symbol or RACH symbol k (k represents a symbol index of the RACH slot, as shown in Table 1 below) may correspond to a code symbol k (or a kth code symbol). In some cases, the length K (the number of RACH symbols within one RACH slot) may be selected based on the desired coverage or capacity of the RACH.

In an aspect, each RACH symbol may comprise three segments: cyclic prefix (CP), sub-sequence, and guard time. In some examples, a sub-sequence may be chosen from a subset of candidates, constructed by using different combinations of a root index and a cyclic shift, and/or determined by the code symbol value of the underlying codeword. In an aspect, the concatenation of multiple sub-sequences is subject to a coding constraint. In some examples, selection of candidate sequences may follow the rule of "maximum distance," which aims to improve the reliability of RACH signature detection and/or contention resolution. In some examples of 5G NR, dimensioning of one or more RACH signatures may be scalable to the capacity and coverage requirements of random access or scheduling request(s) of one or more 5G NR devices.

In some aspects related to RACH signature format(s) and signaling RACH request(s), the format of a RACH signature may be based on a desired capacity and/or coverage of random access. In other words, a RACH or PRACH signature may be scalable depending on a capacity requirement and/or a coverage requirement of the RACH/PRACH. For instance, the network or a base station (e.g., an eNB) may identify the desired capacity and coverage of random access, and may determine or choose at least one RACH signature format based on at least the identified capacity or the identified coverage. In some examples, a base station (e.g., an eNB) may broadcast the determined/chosen format of RACH signature on downlink via a message (e.g., a message including at least a system information block (SIB)) or indication. In some examples, based on received cell-specific system information, a UE may randomly choose a RACH signature and transmit the corresponding waveform to a target base station (e.g., a target eNB). In an implementation, the format of a RACH signature may be a function of the cell-specific system information, which is broadcasted in a message (e.g., a SIB or a Master Information Block (MIB)). In other words, a UE may send or signal a RACH request using a UE-specific signature (e.g., a UE-specific RACH signature).

Additionally, according to the present disclosure, in some aspects, the RACH symbol structure may be orthogonal frequency division multiplexing (OFDM) based. For example, symbols of RACH signature may be based on OFDM with configurable resource mapping. In some examples, a short symbol duration in time domain (e.g., symbol duration ≤150 μs) may be used. In some examples, a different RACH slot may have a different TTI length (e.g., 1 ms, 2 ms, or 3 ms). In some examples, the total bandwidth of a RACH slot may be equal or less than a predetermined bandwidth (e.g., 1.08 MHz).

In one example implementation, successive and/or hybrid detection of RACH signatures may be used at base stations (e.g., eNBs). In some aspects, the RACH signatures may arrive at the base stations at different times, e.g., with a difference in time of arrival (ToA). In some aspects, the disclosure provides for successive and/or hybrid detection that can leverage waveform orthogonality, difference in ToA, coding gain of erasure codes, and/or successive interference cancellation. In some examples, the successive and/or hybrid detection may start with a subset of orthogonal or quasi-orthogonal RACH signatures with higher signal-to-interference-plus-noise ratio (SINR). In some examples, the successive and/or hybrid detection may perform cancellation of decoded signatures. In some examples, the successive and/or hybrid detection may proceed to detect RACH signatures with lower SINR. The above examples may be applied in order, or in any combination.

Each of the aspects described above are performed or implemented in connection with FIGS. 1-15, which are described in more detail below.

Referring to FIG. 1, in an aspect, a wireless communication system 100 includes at least one UE 12 or UE 14 in communication coverage of at least one network entity 20 (e.g., a base station or an eNB, or a cell thereof, in an LTE or a 5G NR network). UE 12 and/or UE 14 may communicate with a network via the network entity 20. In some aspects, multiple UEs including UE 12 and/or UE 14 may be in communication coverage with one or more network entities, including network entity 20. In an aspect, the network entity 20 may be a base station such an eNodeB/eNB in 5G or New Radio (NR) technology network, and/or in a long term evolution (LTE) network. Although various aspects are described in relation to the Universal Mobile Telecommunications System (UMTS), LTE, or 5G NR networks, similar principles may be applied in other wireless wide area networks (WWAN). The wireless network may employ a scheme where multiple base stations may transmit on a channel. In an example, UE 12 and/or UE 14 may transmit and/or receive wireless communications to and/or from network entity 20. For example, the UE 12 and/or UE 14 may be actively communicating with network entity 20.

In some aspects, UE 12 and/or UE 14 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 and/or UE 14 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. Additionally, network entity 14 or network entity 20 may be a macrocell, picocell, femtocell, relay, Node B, mobile Node B, small cell box, UE (e.g., communicating in peer-to-peer or ad-hoc mode with UE 12 and/or UE 14), or substantially any type of component that can communicate with UE 12 and/or UE 14 to provide wireless network access at the UE 12 and/or UE 14.

According to the present aspects, the UE 12 and/or UE 14 may include one or more processors 103 and a memory 130 that may operate in combination with a RACH management component 40 to control a RACH capacity and coverage management component 42 and/or a RACH signature component 44 (and/or its sub-components, a encoding/decoding component 46 and a mapping component 48) for performing random access management and operations as described herein. The network entity 20 may include one or more processors 103 and a memory 130 that may operate in combination with a RACH management component 40 to control a RACH capacity and coverage management component 42 and/or a RACH signature component 44 (and/or its sub-components, a encoding/decoding component 46) for performing random access management and operations as described herein. In some examples, some of the components and/or sub-components are shown in dashed line boxes because some of the components and/or sub-components may be not part of the UE 12/UE 14 or network entity 20 implementation, as applicable.

For example, the RACH management component 40 may perform source RACH symbol or RACH signature format selections, RACH signature encoding/decoding, symbol-to-sequence mapping, and/or successive/hybrid detection of RACH signatures. In an aspect, the term "component" as used herein may be one of the parts that make up a system, may be hardware, firmware, and/or software, and may be divided into other components. The RACH management component 40 may be communicatively coupled to a transceiver 106, which may include a receiver 32 for receiving and processing RF signals and a transmitter 34 for processing and transmitting RF signals. The RACH management component 40 may include the RACH capacity and coverage management component 42 and/or the RACH signature component 44 (and its sub-components) for performing random access management and operations. The processor 103 may be coupled to the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive signals transmitted by UE 12 and/or UE 14 or network entity 20. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 can include a modem 108 that uses one or more modem processors. The various functions related to the RACH management component 40 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the RACH management component 40, including the RACH capacity and coverage management component 42 and/or the RACH signature component 44 (and/or its sub-components).

The RACH management component 40, RACH capacity and coverage management component 42, and/or the RACH signature component 44 (and/or its sub-components) may include hardware, firmware, and/or software code executable by a processor for performing random access management and operations. For example, the hardware may include, for example, a hardware accelerator, or specialized processor.

Moreover, in an aspect, UE 12 and/or UE 14 and/or network entity 20 may include RF front end 104 and transceiver 106 for receiving and transmitting radio transmissions, for example, wireless communications 26. For example, transceiver 106 may transmit or receive a signal that includes a pilot signal (e.g., common pilot channel (CPICH). The transceiver 106 may measure the received pilot signal in order to determine signal quality and for providing feedback to the network entity 20. For example, transceiver 106 may communicate with modem 108 to transmit messages generated by RACH management component 40 and to receive messages and forward them to RACH management component 40.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the RACH management component 40.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 and/or UE 14 can communicate with, for example, network entity 20. In an aspect, for example, modem 108 can configure transceiver 106 to operate at a specified frequency and power level based on the UE configuration of the UE 12 and/or UE 14 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 12 and/or UE 14 or network entity 20 (e.g., RF front end 104, transceiver 106) to enable transmission and/or reception of signals based on a specified modem configuration. In an aspect, the modem configuration can be based on the mode of the modem and the frequency band in use. In another aspect, the modem configuration can be based on UE configuration information associated with UE 12 and/or UE 14 as provided by the network during cell selection and/or cell reselection.

UE 12 and/or UE 14, or network entity 20 may further include memory 130, such as for storing data used herein and/or local versions of applications or RACH management component 40 and/or one or more of its subcomponents being executed by processor 103. Memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining RACH management component 40 and/or one or more of its subcomponents, and/or data associated therewith, when UE 12 and/or UE 14 and/or network entity 20 is operating processor 103 to execute RACH management component 40 and/or one or more of its subcomponents. In another aspect, for example, memory 130 may be a non-transitory computer-readable storage medium. Although memory 130 and processor 103 are shown as separate components, memory 130 may instead be on-board processor 103.

Referring to FIG. 2, in an aspect, a table 200 includes an example of dimensions of PRACH preamble (e.g., used in an LTE network) based on an RACH format index. For example, the table includes a RACH format index, a cyclic prefix time ($T_{CP}$), a sequence timing ($T_{SEQ}$), a guard interval time ($T_G$), an overhead metric, a multipath delay spread, a PRACH transmission time interval (TTI), and a cell coverage metric. In some examples, the current system uses one-shot transmission of preamble sequence(s), which may not be scalable. In some implementations, pessimistic setting for CP and guard time may be used to accommodate worst scenarios. For example, for larger cell radius, longer CP and guard intervals may be used to account for the time uncertainty incurred by round-trip delay and multipath delay. Accordingly, as shown in FIG. 2, different formats of random access preamble may be employed for different cell overage.

Figure 3A:
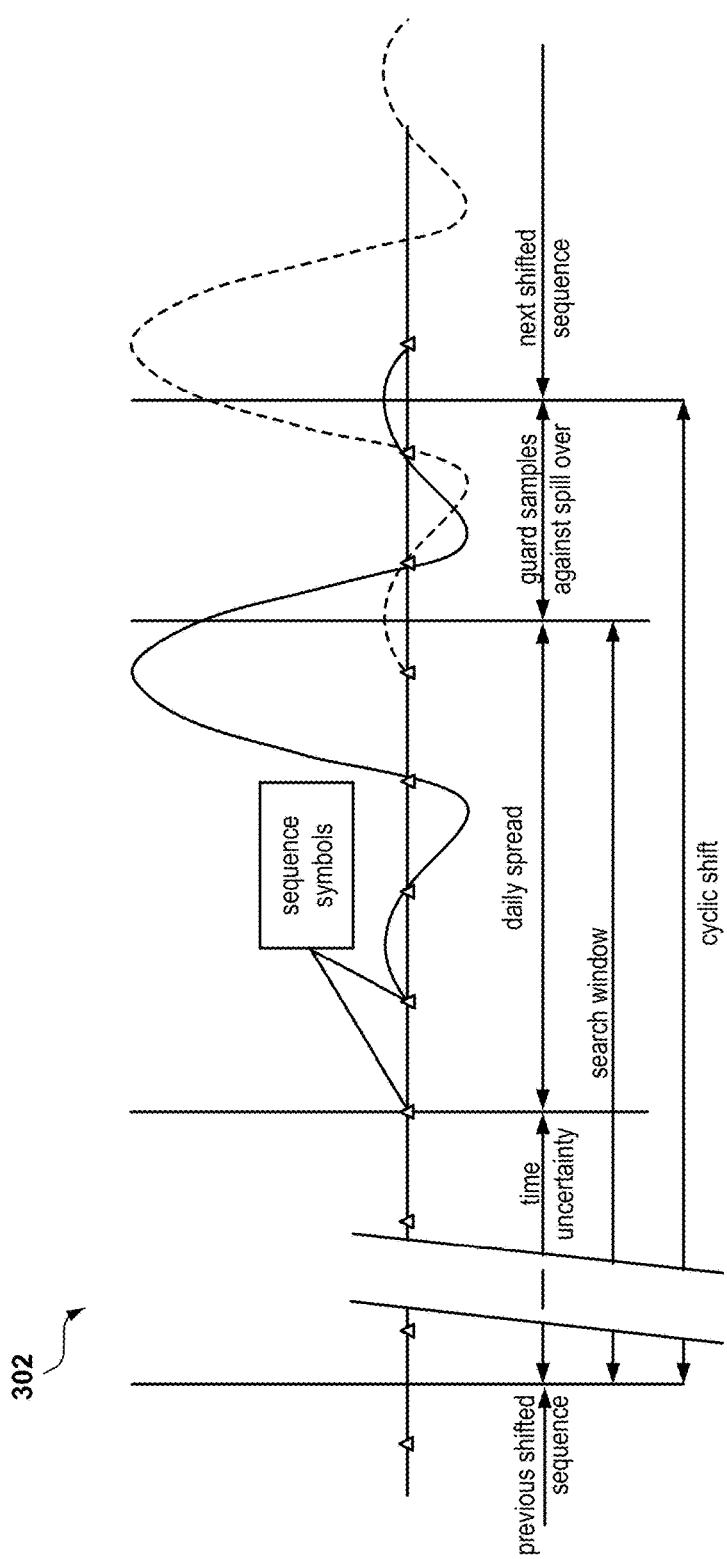
FIGS. 3A to 3C respectively are a graph, a table, and a graph of example step size ($N_{cs}$) configurations of Cyclic Shift used in wireless communications.
Figure 3B:
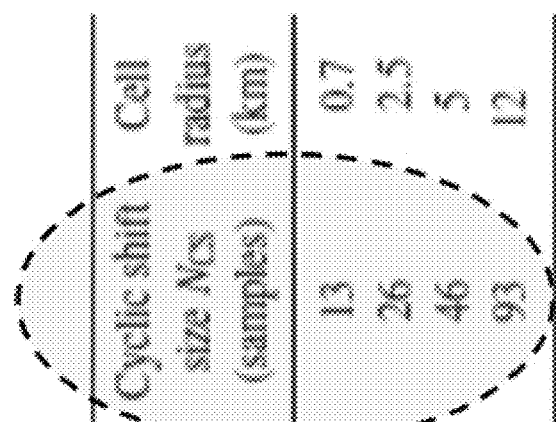
Figure 3C:
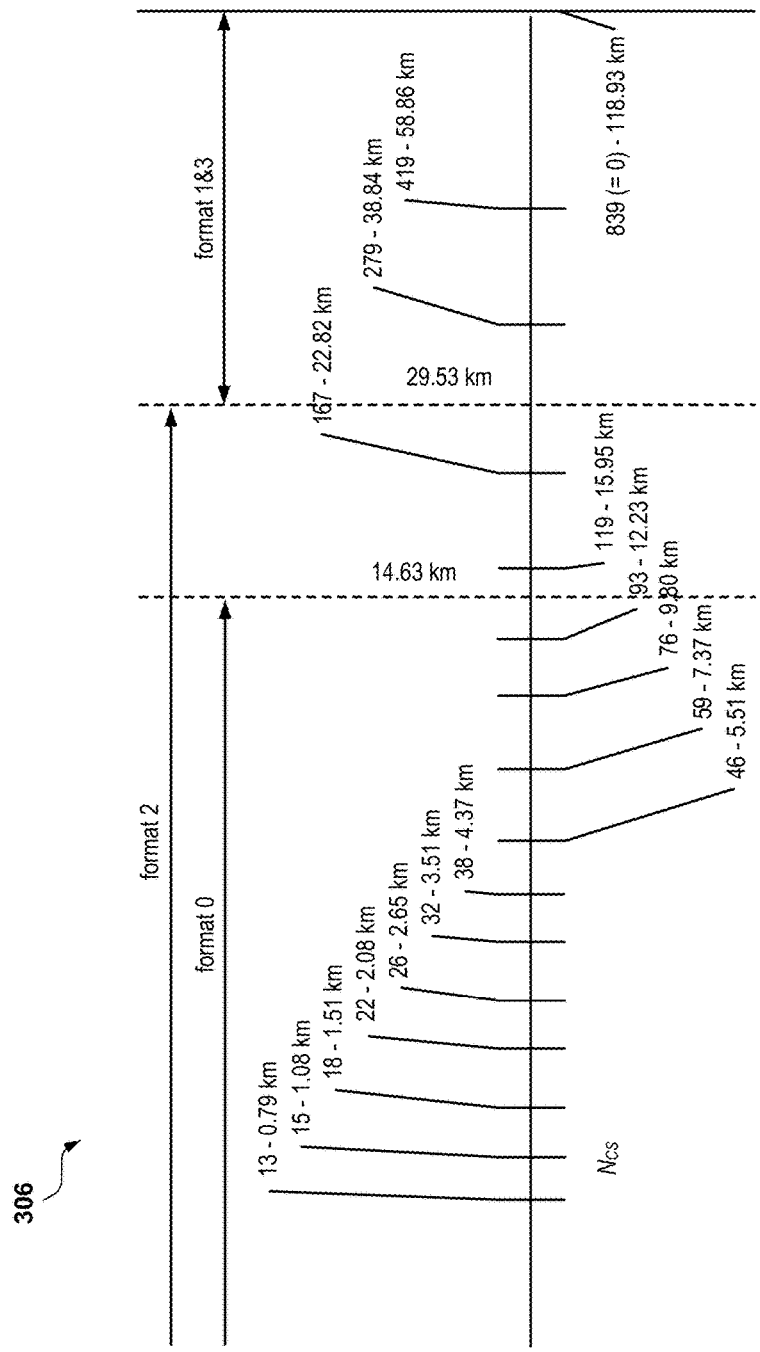

Referring to FIGS. 3A, 3B, and 3C, a graph 302, a table 304, and a graph 306, respectively, include examples of step size (Ncs) configurations of Cyclic Shift used in a conventional wireless communications system.

Figure 4:
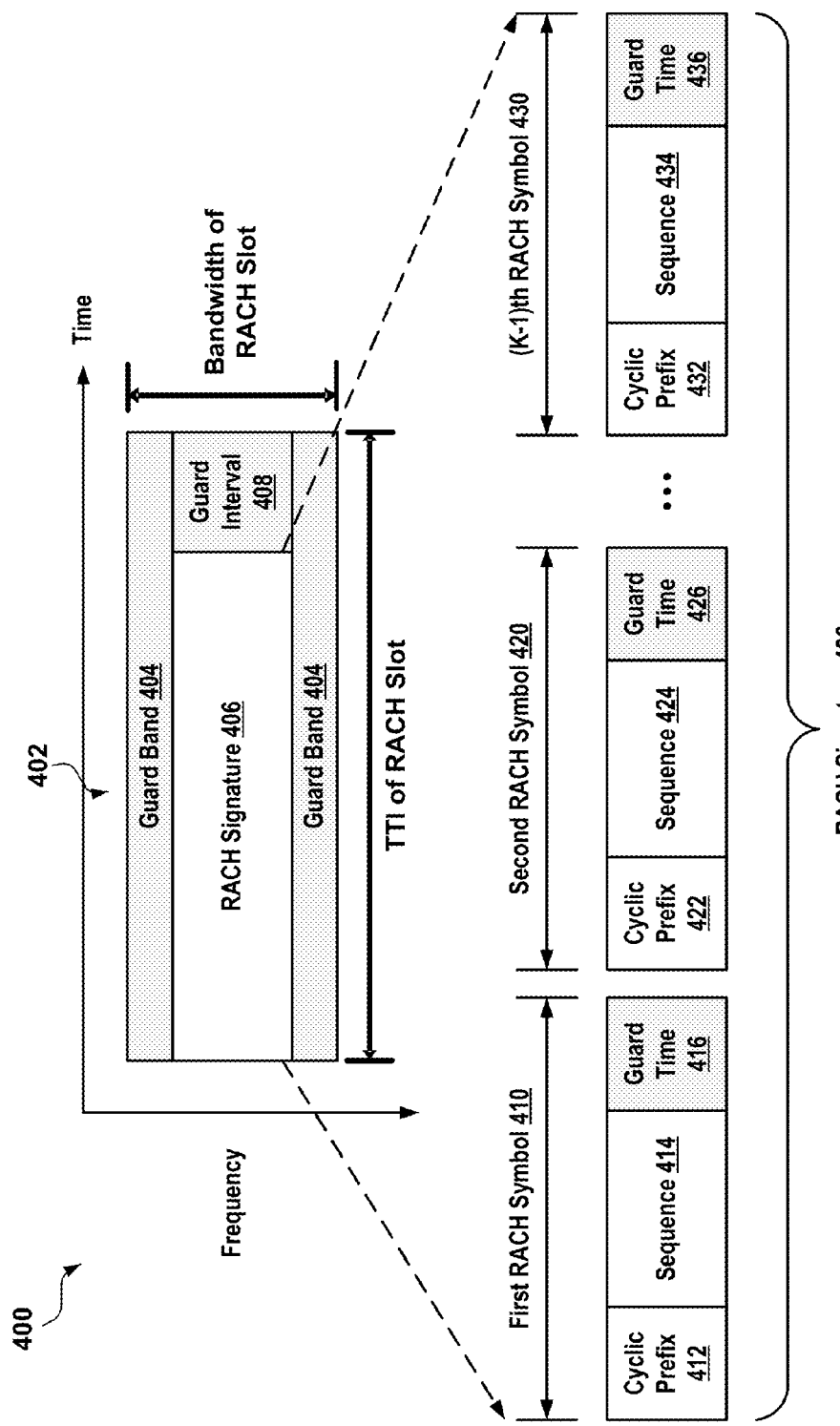
FIG. 4 is a block diagram of an example frame structure of a RACH slot (across frequency and over time) including a scalable RACH signature, which includes one or more RACH symbols, according to one or more of the presently described aspects.

Referring to FIG. 4, in an aspect of the present disclosure, a RACH slot design 400 is provided. In FIG. 4, in an example, a RACH slot 402 may include a scalable RACH signature 406, a guard interval 408 in time domain, and/or one or more guard band 404 in frequency domain. In some implementations, dimensioning of one or more RACH signatures (e.g., the RACH signature 406) may be scalable to different capacity and/or coverage requirements of random access or scheduling request(s) of one or more UEs (e.g., the UE 12, the UE 14, or a 5G NR device). In some examples, the RACH signature 406 may include one or more RACH symbols (e.g., a first RACH symbol 410, a second RACH symbol 420, and/or up to a $(K-1)^{th}$ RACH symbol 430), and each RACH symbol may include a CP, a sequence, and/or a guard time in time domain. For example, the RACH symbol 410 may include a CP 412, a sequence 414, and/or a guard time 416. Similarly, the RACH symbol 420 may include a CP 422, a sequence 424, and/or a guard time 426, and the RACH symbol 430 may include a CP 432, a sequence 434, and/or a guard time 436.

Still referring to FIG. 4, in some examples, each RACH signature may be a codeword (e.g., a short-length codeword) comprising K non-binary symbols, which is generated by a FEC encoder having MDS, erasure resilient, and short-length characteristics. In the examples discussed herein, "K" is used to represent the length of the codeword (including source symbols and parity symbols), and "M" is used to denote the size of the source symbols. The length-K codeword (e.g., a short-length MDS codeword) may comprise M source symbols, and K-M parity symbols. For example, a codeword (e.g., a short-length codeword) may be mapped to a RACH signature (constructed by a Reed-Solomon codeword with K non-binary coded symbols, which can be further split into M source symbols and K-M parity symbols). For instance, the codeword or RACH signature may be RS (7, 3), RS (15, 3), or RS (15, 5). In some aspects, each code symbol is mapped to one out of a finite-size of orthogonal or quasi-orthogonal sequences. For example, each code symbol may be mapped to Zadoff-Chu sequences with a same root index and different cyclic shifts. As another example, different code symbols may use different root index(s) (e.g., as shown later in table 700 of FIG. 7).

In some examples, symbol-to-sequence mapping may be a function of a cell ID and a symbol index. For example, different symbols may be mapped to different sets of orthogonal sequences to reduce the interference among asynchronous RACH signatures. In another example, neighbor cells may consider a different permutation order of symbol mapping to reduce inter-cell interference (ICI). In other words, the order of symbol mapping may be different for different cells. In some examples, the structure or format of RACH symbols may be based on OFDM. For example, the structure or format of a RACH symbol may include a short cyclic prefix, a short duration of sequences, and/or a short guard time. In some aspects, the short cyclic prefix and short guard time may be used to separate the RACH signatures sent by different UEs with same or similar coverage range. In an example implementation, the guard interval of a RACH signature is much longer than the guard time of each RACH symbol. In some aspects, the guard interval may be used to separate the RACH signatures sent by UEs with large coverage differences, as well as to reduce the inter-symbol interference (ISI) between a RACH signal and other signals sent following a RACH transmission.

Referring to FIG. 5, in an aspect, an example RACH format/structure 500 for RACH slots is provided. In some implementations of the RACH format/structure 500, some parameters (e.g., the length of a CP, a RACH sequence and a guard time, as well as the number of distinctive RACH sequences) may be configurable and scalable. In some examples, a RACH slot 502 may include a scalable RACH signature (e.g., the RACH signature 406 in FIG. 4) for normal cell coverage, and the scalable RACH signature may include various RACH symbols 506 ($1^{st}$ RACH symbol to $7^{th}$ RACH symbol in the example of FIG. 5). In some implementations, each RACH symbol 506 may include a CP 510, a RACH sequence 512, and a guard time 514. In an example, with regard to a normal cell coverage, it is assumed that a cell radius is equal or less than 14.53 km, and a desired RACH capacity equals to 512 (8×8×8=512). In time domain, the RACH signature (e.g., the RACH signature 406) is included in the RACH slot 502 having a duration of 1 ms, and the RACH signature may include seven (K=7) RACH symbols 506 (e.g., the $1^{st}$ RACH Symbol to the $7^{th}$ RACH Symbol as shown in FIG. 5, or RACH Symbol #0 to RACH Symbol #6). In an example, each RACH symbol 506 has a time duration $T_{sym}$ (e.g., $T_{sym}$=131.25 μs), and the RACH slot 502 may include a normal guard interval 508 with $T_{NG}$ (e.g., $T_{NG}$=96.875 μs). In frequency domain, for example, the bandwidth of the RACH slot 502 may be 1.08 MHz, including multiple subcarriers (e.g., 839 subcarriers with 1.25 kHz subcarrier spacing) and two guard bands each having a 12.5 kHz bandwidth. In an aspect, the RACH symbol 506 may include the CP 510 which has a time duration $T_{CP}$=21.875 μs, the RACH sequence 512 which has a time duration $T_{SEQ}$=93.75 μs, and the guard time 514 of $T_G$=15.625 μs. In some examples, each RACH symbol 506 in the RACH signature (e.g., the RACH signature 406) is chosen or configured/constructed based on a RACH symbol index (e.g., an index shown in FIG. 7) and/or a predetermined order.

Referring to FIG. 6, in an aspect, an example RACH format/structure 600 for RACH slots is provided. In some implementations of the RACH format/structure 600, some parameters (e.g., the length of a CP, a RACH sequence and a guard time, as well as the number of distinctive RACH sequences) may be configurable and scalable. In some examples, a RACH slot 602 may include a scalable RACH signature (e.g., the RACH signature 406 in FIG. 4) for extended cell coverage, and the scalable RACH signature may include additional RACH symbols (e.g., K=15) to accommodate the extended coverage, relative to the RACH format/structure 500 in FIG. 5. In some implementations, the RACH signature in the RACH slot 602 may have various RACH symbols 606. In an example, for an extended coverage cell, it is assumed that a cell radius is around 100 km, and a desired RACH capacity is equal to or more than 512. In time domain, the RACH signature is included in the RACH slot 602 having a duration of 3 ms, and the RACH slot 602 may include fifteen (K=15) RACH symbols 606 (e.g., the first RACH Symbol to the $15^{th}$ RACH Symbol as shown in FIG. 6, or RACH Symbol #0 to RACH Symbol #14). The greater number of RACH symbols 606 in the RACH signature (e.g., the RACH signature 406) allows for the inclusion of parity symbols, and thus more redundancy, as compared with the RACH signature with the RACH format/structure 500 in FIG. 5.

In an aspect, each RACH symbol 606 may have a time duration $T_{sym}$=150 μs, and the RACH slot 602 may include an extended guard interval 608 with a time duration $T_{EG}$=750 μs. In an aspect, the extended guard interval 608 may accommodate a longer round trip time delay, meanwhile, the extended guard interval 608 may be associated with a larger coverage area. In some examples, the extended guard interval 608 may be used to separate RACH signatures sent by UEs with large coverage differences, as well as to reduce the ISI incurred by RACH signal transmission from cell-edge UEs. In frequency domain, the bandwidth of the RACH slot 602 is 1.08 MHz, including 839 subcarriers (e.g., with 1.25 kHz subcarrier spacing), and two guard bands with each having a 12.5 kHz bandwidth. In an example, each RACH symbol 606 may include a CP 610 having a time duration $T_{CP}$=34.375 μs, a RACH sequence 612 having a time duration $T_{SEQ}$=93.75 μs, and a guard time 614 having a time duration $T_G$=21.875 μs. In some examples, each RACH symbol 606 may be chosen or configured/constructed based on a RACH symbol index (e.g., an index that is same or similar to the index shown in FIG. 7). In an aspect, the RACH signature in the RACH slot 602 may utilize a longer codeword, e.g., transmitted (or received) for a longer time at a same power, which allows for a larger coverage area as compared with the RACH signature with the RACH format/structure 500 in FIG. 5. In another aspect, a link budget may be related to the transmit power and/or the time used for communications.

Figure 7:
FIG. 7 is a table of an example of symbol-specific mapping of a RACH signature for normal cell coverage, according to one or more of the presently described aspects.

Referring to FIG. 7, in an aspect, a table 700 includes a RACH symbol index (including a root index, an initial offset, a range of cyclic shifts, a step size of cyclic shifts, and a ZC sequence length) and respective RACH symbols for a symbol specific mapping of a RACH signature for normal cell coverage. In this example, the RACH signature may occupy 7 OFDM symbols. For each symbol, the waveform is constructed by choosing from one out of eight mutually orthogonal Zadoff Chu sequences, which have the same root index but different cyclic shifts. The selection of root index and cyclic shifts is symbol specific. The cross correlation of Zadoff Chu sequences used by different symbols may be small by design. In this aspect, length-839 Zadoff-Chu Sequences from LTE may be re-used. In an example implementation, an LTE network may use Zadoff-Chu Sequences for generating RACH signatures, and may use a single root index.

In another example implementation (e.g., 5G NR), as shown in the example table in FIG. 7, symbol-specific mapping of a RACH signature for normal cell coverage (e.g., a cell radius is equal or less than 14.53 km) may be used for configuring or constructing a scalable RACH signature for normal cell coverage as shown in FIG. 5. In the table 700, root index $u_k$, initial offset $\Delta_k$, an example range of cyclic shifts, step size of cyclic shifts $N_{cs}$, Zadoff-Chu sequence length $N_{zc}$ are shown with the RACH symbol k (e.g., 0 to 6). For example, the range of cyclic shifts in the table 700 may be used to demonstrate the alphabet size 8 for RS (7, 3) code symbol, which may be mapped to eight (8) orthogonal Zadoff-Chu sequences with the same root index but with different cyclic shifts.

In some aspects, the symbol-specific mapping of a RACH signature in FIG. 7 may be determined or represented by one or more equations. In an example, the candidate sub-sequences (e.g., with a same root index, and different cyclic shifts) for RACH symbol k may be represented by Equation (1):

$$x_{k,l}(n) = \exp\left(-j\pi \frac{u_k n(n+1) + 2n(lN_{cs} + \Delta_k)}{N_{zc}}\right), \quad (1)$$

$$0 \leq k \leq (K-1), l \in \{0, 1, 2, 3, 4, 5, 6, 7\}$$

where l is used to index the 8-ary alphabet corresponding to RACH symbol k, and index "l" runs from 0 to 7. In some examples, one or more candidate sub-sequences may be concatenated into one RACH signature. For example, concatenation of K sub-sequences into one RACH signature may be represented by Equation (2):

$$s(t) = \sum_{k=0}^{K-1} p[t - k(T_{CP} + T_{SEQ} + T_G)] \quad (2)$$

$$\sum_{k=0}^{N_{zc}-1} \sum_{n=0}^{N_{zc}-1} x_{k,l}(n) \exp\left(-j\frac{2\pi nk}{N_{zc}}\right) \exp\left\{j2\pi\left(k + \frac{1}{2} + K\right)\Delta f_{RA} t\right\}$$

where $p[t-k(T_{CP}+T_{SEQ}+T_G)]$ may be used for pulse shaping and/or windowing, and $$\sum_{k=0}^{N_{zc}-1} \sum_{n=0}^{N_{zc}-1} x_{k,l}(n) \exp\left(-j\frac{2\pi nk}{N_{zc}}\right) \exp\left\{j2\pi\left(k + \frac{1}{2} + K\right)\Delta f_{RA} t\right\}$$

may be used for discrete Fourier transform (DFT), DFT-spread OFDM (DFT-S-OFDM), and/or frequency shift. In some aspects, the symbols and/or notations used by Equations (1) and (2) may be explained in Table 1.

TABLE 1

Explanations of notations used by Equations (1) and (2)

| SYMBOL | MEANING |
|---|---|
| k | Symbol index of RACH slot; |
| K | Total number of RACH symbols within one RACH slot; |
| $\mu_k$ | Root index of the sub-sequences used by RACH symbol k; |
| $\Delta_k$ | Initial phase offset of the sub-sequences used by RACH symbol k; |
| $T_{CP}/T_{SEQ}/T_G$ | Time duration of cyclic-prefix/sub-sequence/guard-time; |
| $N_{CS}$ | Step size of the cyclic shift (e.g., used for constructing the candidate sub-sequences mapped to each RACH symbol); |
| $N_{ZC}$ | Length of the sub-sequences; |
| l | Index of the sub-sequence used by RACH symbol k (e.g., each symbol chooses one out of 8 candidate sub-sequences, therefore "l" belongs to 0~7); |
| n | Index of the waveform samples for the sub-sequence chosen by RACH symbol k; |
| $\Delta f_{RA}$ | Tone spacing for the frequency mapping of sub-sequences. |

Still referring to FIG. 7, in an example implementation, an LTE network may synchronize in the downlink (e.g., via transmitting/receiving a Timing Advance (TA)), but may not synchronize in uplink communications.

In another example implementation (e.g., 5G NR), TA for enhanced RACH preambles may be used for uplink timing synchronization. For example, when a round trip delay is equal to or shorter than a guard time in a RACH symbol, base sequences with a same root index and different cyclic shifts may be used, and orthogonality between different RACH preambles may be preserved. In this case, translation of cyclic shifts provides reference for TA of smaller cells. In another example, when a round trip delay is longer than a guard time in a RACH symbol, base sequences with different root index may be used, quasi-orthogonality between different preambles may be preserved, and the order of root index arrangement may bear the time stamp of RACH signal transmission. In this case, ToA estimation of RACH segments may provide reference for TA adjustment in larger cells.

Figure 8:
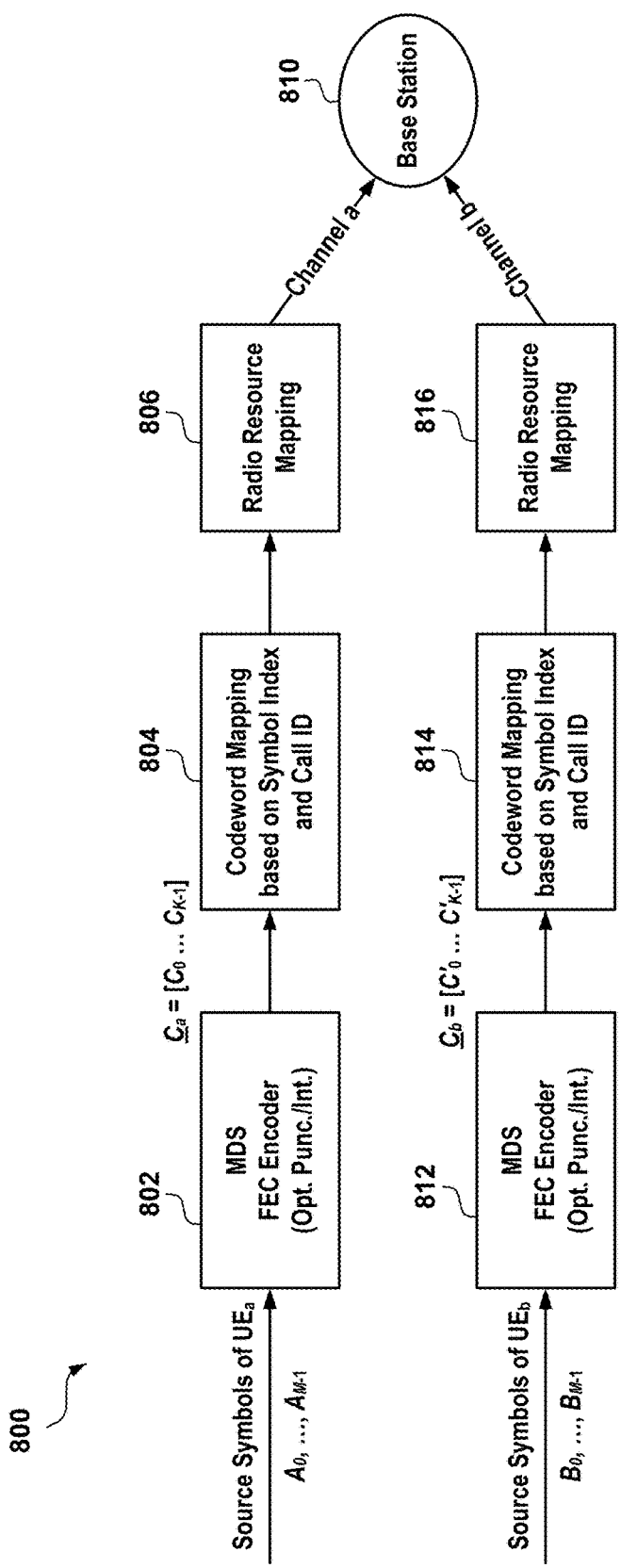
FIG. 8 is a block diagram of an example function for the construction of scalable RACH signatures, according to one or more of the presently described aspects.

Referring to FIG. 8, in an aspect, an example function 800 is used to construct one or more RACH signatures (e.g., the RACH signature 406 in FIG. 4) discussed herein. In some aspects, a codeword for a RACH signature (e.g., the RACH signature 406) may be generated by a maximal distance separable (MDS) FEC encoder 802, 812 (e.g. using Reed-Solomon code). For example, a first set of source symbols of UE 14 or $UE_a$ (e.g., M source symbols, $A_0, \ldots, A_{M-1}$, as shown in FIG. 8) may be input to the MDS FEC encoder 802, and a second set of source symbols of UE 12 or $UE_b$ (e.g., M source symbols, $B_0, \ldots, B_{M-1}$, as shown in FIG. 8) may be input to the MDS FEC encoder 812. In an example, a UE identity (ID) may be carried by a number of source symbols (e.g., M source symbols), and parity symbols (e.g., K-M parity symbols) may provide FEC capability for multi-user detection of contention-based access. In an aspect, puncturing and/or interleaving may be applied to the output of the MDS FEC encoder 802, 812. In an example, as shown in FIG. 8, the output of the MDS FEC encoder 802 of UE 14 or $UE_a$ may be represented by $C_a=[C_0 \ldots C_{K-1}]$, and the output of the MDS FEC encoder 802 of UE 12 or $UE_b$ may be represented by $C_b=[C_0 \ldots C_{K-1}]$. In some examples, at blocks 804, 814, codeword mapping may be performed based on a symbol index and/or a cell ID. In an aspect, codewords may be represented by a sequence of orthogonal or quasi-orthogonal waveforms, for example, a Chu sequence with different cyclic shifts, a chirp sequence with different patterns, a pseudo-random noise (PN) sequence, or Walsh codes. In some examples, radio resource mapping may be applied at block 806, 816 before transmitting the waveforms/codewords to a base station 810 (e.g., the network entity 20 in FIG. 1, or an eNB).

Figure 9:
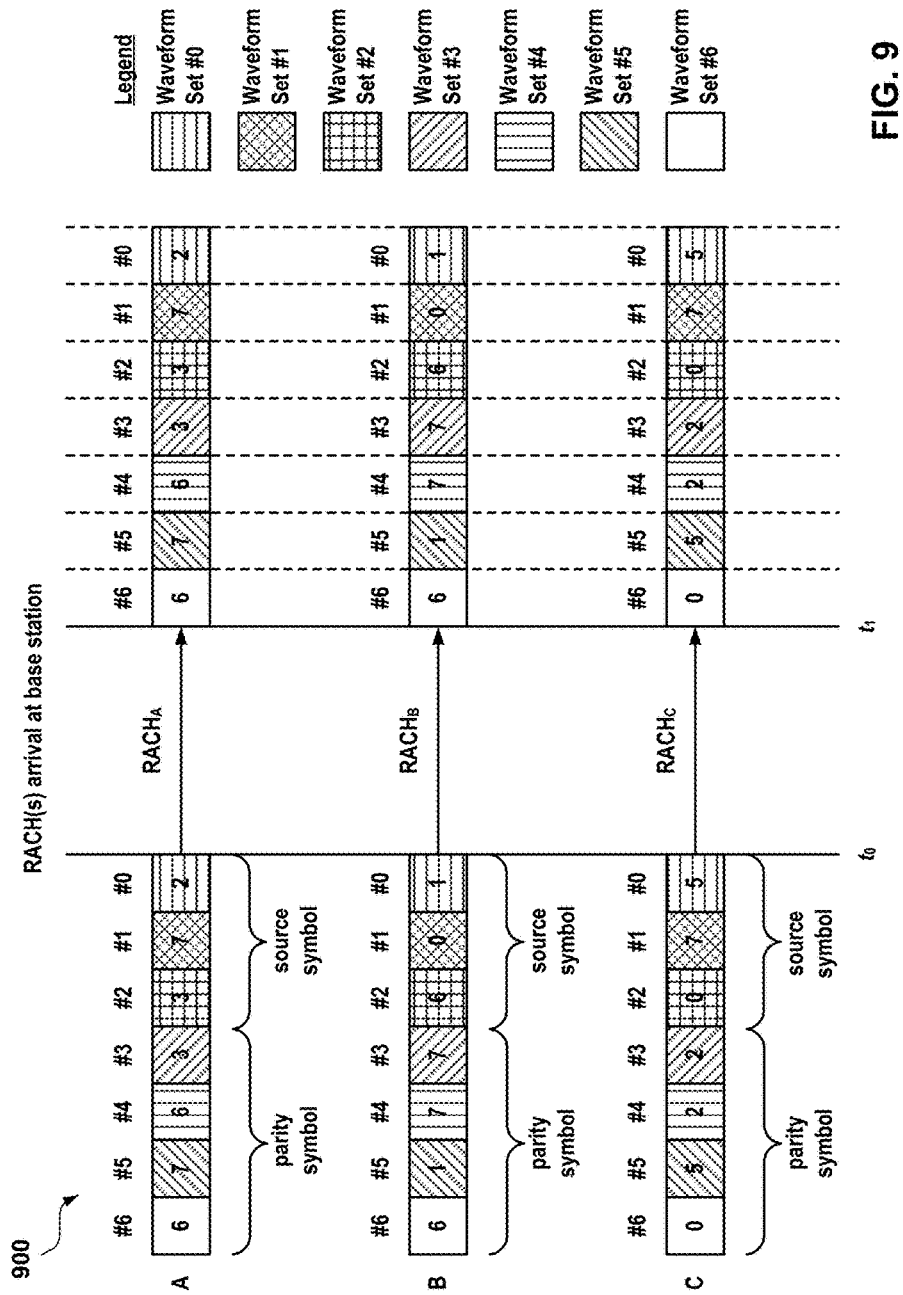
FIG. 9 is a timeline of an example of synchronous time-of-arrival of RACH signatures at a base station (e.g., an eNB), according to one or more of the presently described aspects.
Figure 10:
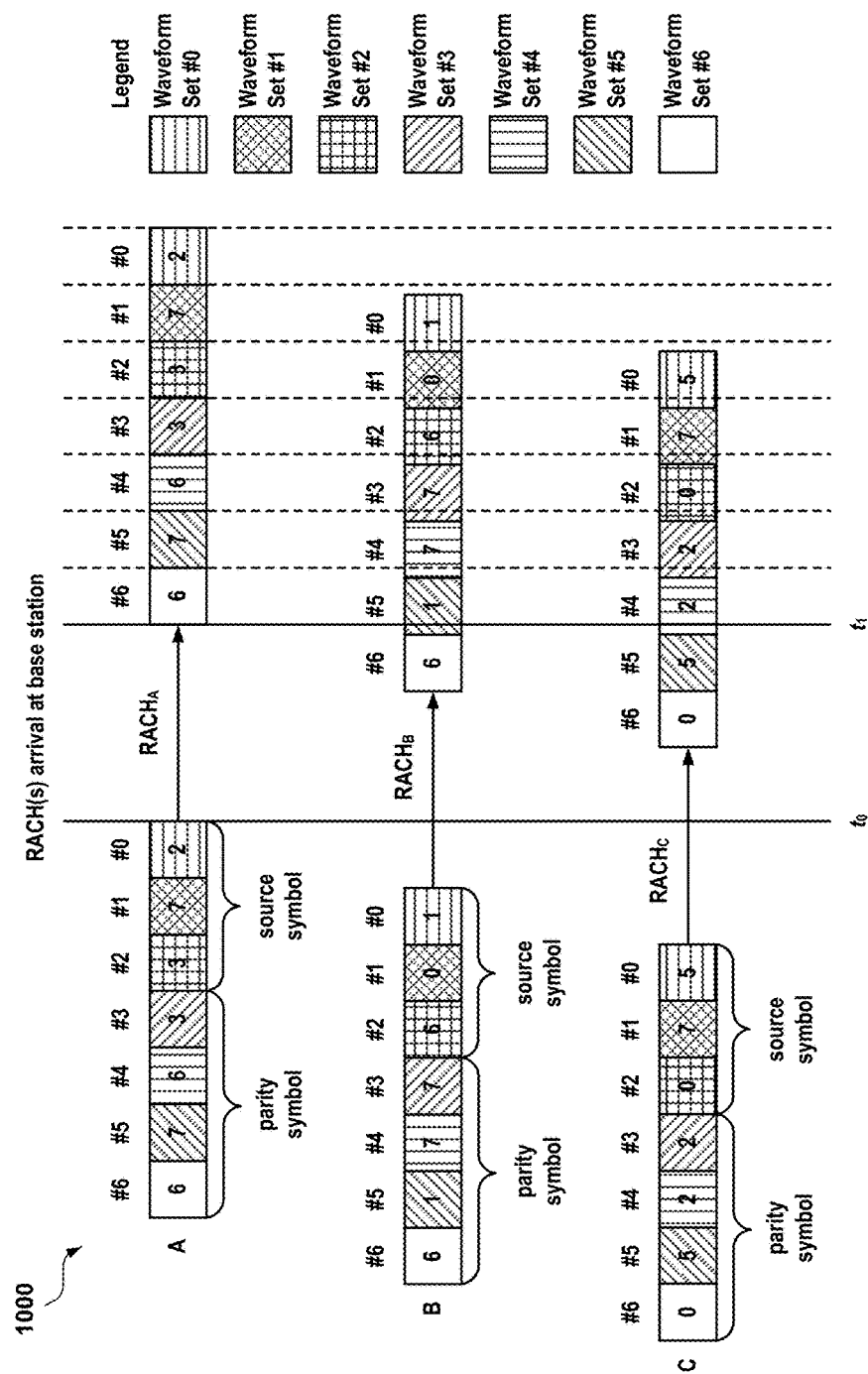
FIG. 10 is a timeline of an example asynchronous time-of-arrival of RACH sequences at a base station (e.g., an eNB), according to one or more of the presently described aspects.

Referring to FIGS. 9 and 10, in some aspects, timeline 900 and timeline 1000, each related to hybrid receiver processing, include different UEs transmitting RACH signatures (e.g., different RACH signatures) that are received by an eNB. As described herein, the structure of the RACH signatures may allow bi-directional decoding and successive interference cancellation (SIC) to be performed for a given RACH slot. In an example, RACH signatures may be sent from close-by UEs, with early and deterministic ToA. In this case, optimized transmission parameters may be used or applied. In an aspect, the RACH signatures from close-by UEs may encounter "collision" from far-away UE(s). In this case, interference suppression may be applied by the selection of orthogonal or quasi-orthogonal sequences for each RACH symbol. In another aspect, erasure correction may be inherent to the chosen codebook. In an aspect, SIC may be performed or used.

In another example, RACH signatures may be sent from cell-edge UEs, with late and deterministic ToA. In this case, the direction of decoding may be reversed (compared with the sending order). In an aspect, the RACH signatures from cell-edge UEs may encounter "collision" from closer UE(s). In this case, interference suppression may be applied by the selection of orthogonal/quasi-orthogonal sequences for each RACH symbol. In another aspect, erasure correction may be inherent to the chosen codebook. In an aspect, SIC may be performed or used. In some examples, if a same index is used for different RACH symbols, the different RACH symbols may use different CP to differ from each other.

Referring to FIG. 9, in an aspect, timeline 900 includes synchronous arrival of RACH signatures at a base station (e.g., an eNB). For example, when round trip delay difference is equal to or shorter than the guard time of a RACH symbol, the arrivals of RACH signatures may be synchronous. According to the present disclosure, on a symbol level, the RACH signatures may be formatted such that the waveforms of different RACH signatures (and symbols, as noted in the Legend) are orthogonal or quasi-orthogonal. In some examples, base stations (e.g., eNBs) may distinguish the RACH requests signaled by different codewords.

Referring to FIG. 10, in an aspect, timeline 1000 includes asynchronous arrival of RACH signatures at a base station (e.g., an eNB). For example, RACH signatures from different UEs may arrive at the base station with different timing, and sometimes the asynchronous arrival may be caused by propagation delay. Further, when round trip delay difference is longer than the guard time of a RACH symbol, the arrivals of RACH signatures may be asynchronous. In this case, according to the present disclosure, the base station may selectively detect a subset of RACH sequences with higher SINR and cancel them from the receive signal.

In other aspects, RACH capacity may be improved for normal cell coverage (e.g., a cell coverage equal or less than 14.5 km). In an aspect, if a desired RACH capacity is equal to or less than 512 (e.g., 512 users), for the scalable RACH signature design described herein, three (M=3) source symbols may be used to indicate the UE ID(s), a length-7 codeword (K=7) may be generated by a RS (7, 3) encoder, and the sequences may be mapped to 7 RACH symbols according to the example RACH structure 500 in FIG. 5 and the symbol-specific mapping in FIG. 7. In this case, a RACH slot duration (e.g., 7 symbols+normal guard interval) is 1 ms. In another aspect, if the desired RACH capacity is greater than 512 (e.g., 512 users), for the scalable RACH signature design described herein, five (M=5) source symbols may be used to indicate UE ID(s), a length-7 codeword (K=7) may be generated by a by RS (7, 5) encoder, and the sequences may be mapped to 7 RACH symbols according to the example RACH structure 500 in FIG. 5 and the symbol-specific mapping in FIG. 7. In this case, a RACH slot duration (e.g., 7 symbols+normal guard interval) is 1 ms or 2 ms.

In some examples of the present disclosure, RACH capacity may be improved for an extended cell coverage (e.g., a cell coverage of up to about 100 km). In an aspect, if a desired RACH capacity is equal to or less than 512 (e.g., 512 users), for the scalable RACH signature design described herein, three (M=3) source symbols may be used to indicate UE ID(s), a length-15 codeword (K=15) may be generated by a RS (15, 3) encoder, and the sequences may be mapped to 15 RACH symbols according to the example RACH structure 600 in FIG. 6 and a symbol-specific mapping based on an extension of FIG. 7 for longer signature length and larger alphabet size. In this case, a RACH slot duration (e.g., 15 symbols+extended guard interval) is 3 ms. In another aspect, if the desired RACH capacity is greater than 512 (e.g., 512 users), for the scalable RACH signature design described herein, five (M=5) source symbols may be used to indicate the UE ID(s), a length-15 codeword (K=15) may be generated by a RS (15, 5) encoder, and the sequences may be mapped to 15 RACH symbols according to the example RACH structure 600 in FIG. 6 and a symbol-specific mapping based on an extension of FIG. 7 for longer signature length and larger alphabet size. In this case, a RACH slot duration (e.g., 15 symbols+extended guard interval) is 3 ms.

In an aspect, when a relatively larger RACH capacity is needed, then a relatively greater number of source symbols may be needed.

Figure 11:
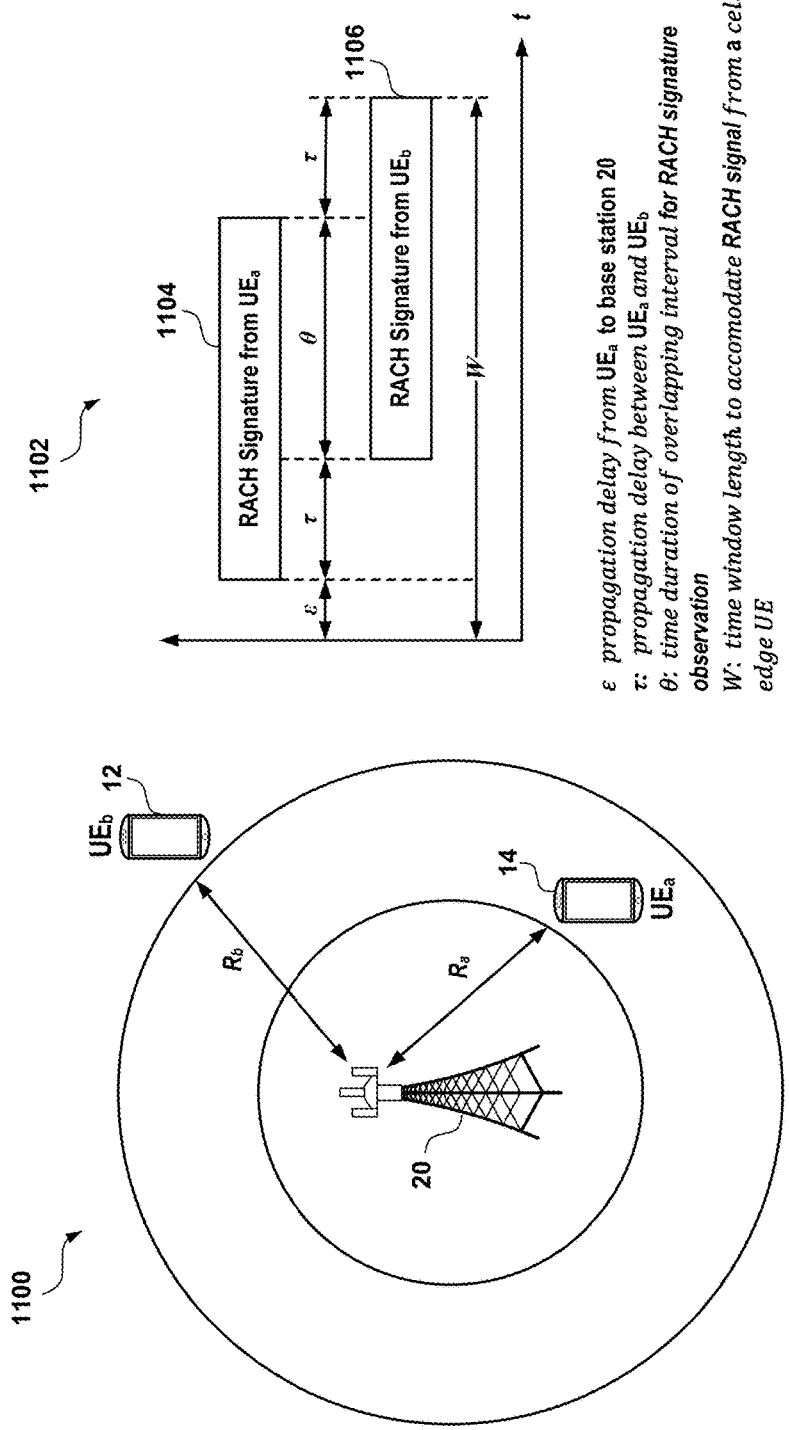
FIG. 11 includes a schematic diagram and a graph of RACH signatures over time for an example of RACH parameters selection based on different round trip delay, according to one or more of the presently described aspects.

Referring to FIG. 11, in an example, network 1100 may include a base station (e.g., an eNB, or the network entity 20 in FIG. 1) communicating with UEs (e.g., the UE 12 or $UE_b$, and the UE 14 or $UE_a$) having different coverage ranges, resulting in RACH signatures with different arrival times at the base stations on graph 1102. In this aspect, for example, RACH parameters may be selected based on different round trip delays (e.g., $R_a$ and $R_b$) which are based on or associated with different propagation delays. In this example, two UEs, the UE 12 or $UE_b$, and the UE 14 or $UE_a$, are illustrated and each UE transmits a RACH signature to the base station 20. For example, the UE 14 or $UE_a$ transmits a RACH signature 1104, and the UE 12 or $UE_b$ transmits a RACH signature 1106. In some examples, the same RACH signature design and RACH transmission/reception may be extended/applied to a scheduling request or a signaling request (SR).

In an implementation, the RACH parameters may include E which represents the round trip delay from $UE_a$ to the base station 20, $\tau$ which represents the round trip delay difference between $UE_a$ and $UE_b$, $\theta$ which represents the overlapping duration of two non-synchronized RACH signatures, and W which represents the time window length for RACH signature observation(s). In an example, in FIG. 11, the time window length for a RACH signature observation W may depend on the intended coverage, and may be represented by the following equations:

$$W_a = \varepsilon + \tau + \theta \quad (3)$$

$$W_b = \varepsilon + 2\tau + \theta \quad (4)$$

where $W_a$ is the time window length for a RACH signature observation of UE 14 or $UE_a$, $W_b$ is the time window length for a RACH signature observation of UE 12 or $UE_b$, and the time window length $W_b$ is larger than the time window length $W_a$. For multi-user detection (MUD) without SIC, the observation window may need to consider the overlapping interval (e.g., overlapping duration/length $\theta$). For example, when considering or determining time efficiency for RACH signatures 1104 and 1106, $\theta/(\theta+\varepsilon+2\tau)$ may be used. In addition, when considering or determining energy efficiency for RACH signatures 1104 and 1106, $\theta/(\theta+\tau)$ may be used.

Figure 12:
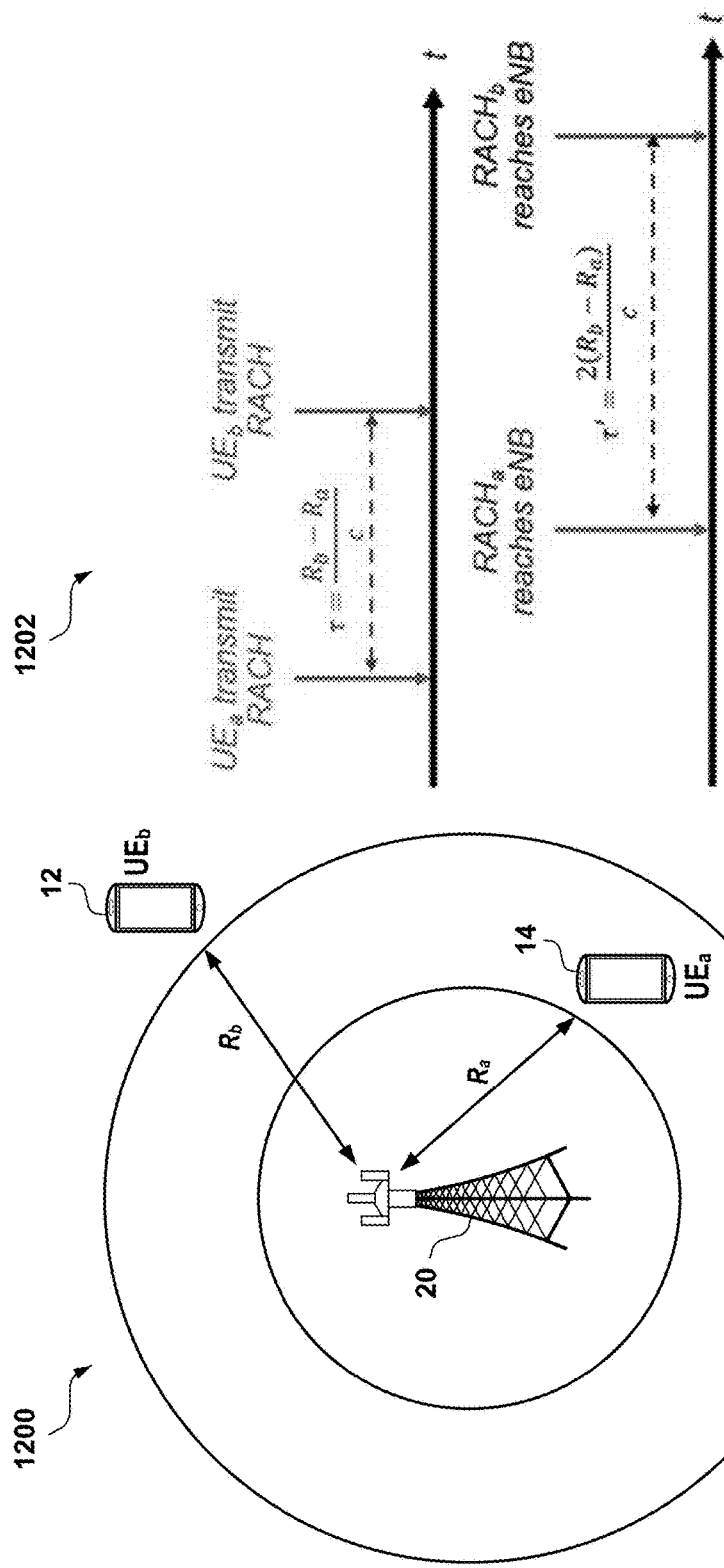
FIG. 12 includes a schematic diagram and a graph of UE transmissions of RACH over time for an example of waveform detection based on time of arrival (ToA) of RACH signatures, according to one or more of the presently described aspects.

In some implementations, RACH parameters may be selected for the RACH management and operations, according to one or more of the aspects discussed herein. In some examples, time durations of the guard time, the CP, or the sequence in a RACH symbol (e.g., the RACH symbol 506/606), the time dimensioning for a RACH symbol (e.g., the RACH symbol 506/606), a cell radius, and/or transmission efficiency (e.g., time efficiency or energy efficiency) may be used (individually or combined) for the RACH parameters selection. For example, in selecting RACH parameters, one or more of the following relationships may be taken into account:

coverage extension→larger cell radius
transmission efficiency→smaller cell radius
RACH capacity requirement→constraint on symbol length and coding rate
interference avoidance→constraint on guard interval and guard time
sampling rate and resource allocation→constraint on bandwidth and time duration Referring to FIG. 12, an example network 1200 includes at least a base station 20 (e.g., the network entity or eNB 20 in FIG. 1) communicating with UEs 12 and 14 (e.g., $UE_b$ and $UE_a$) having different coverage ranges, resulting in RACH signatures (e.g., the RACH signatures 1104 and 1106 in FIG. 11) with different arrival times at base station 20 on graph 1202. Graph 1202 relates to aspects of waveform detection based on ToA of RACH signatures or preambles (e.g., the RACH signatures 1104 and 1106). In an aspect, ToA for a RACH signature or a RACH preamble may depend on the distance between a UE and a base station (e.g., an eNB). In an aspect, the base station 20 may use different ToA to distinguish between different UEs (e.g., UEs 12 and 14, or $UE_b$ and $UE_a$). For example, if $UE_a$ and $UE_b$ start RACH transmissions simultaneously, and $RACH_a$ (e.g., the RACH signature 1104) reaches the base station earlier than $RACH_b$ (e.g., the RACH signature 1106), then $R_a < R_b$, where R represents the distance between a UE (e.g., $UE_b$ or $UE_a$) and the base station 20. In another aspect, a difference of ToA may be related to the difference of propagation distance (assuming multipath delay spread is similar). In this case, ToA may be quasi-static for a low-speed UE. In an aspect, waveforms corresponding to n-th code symbol may be configured as a function of n. For example, waveforms bear the time-stamp of random access (RA) slot index, and RACH signals from a geographically close UE (e.g., $UE_a$) and a geographically distant UE (e.g., $UE_b$) may be separated if their ToA discrepancy is sufficiently large. In this case, a small correlation of RACH signature sequences may be achieved.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 13:
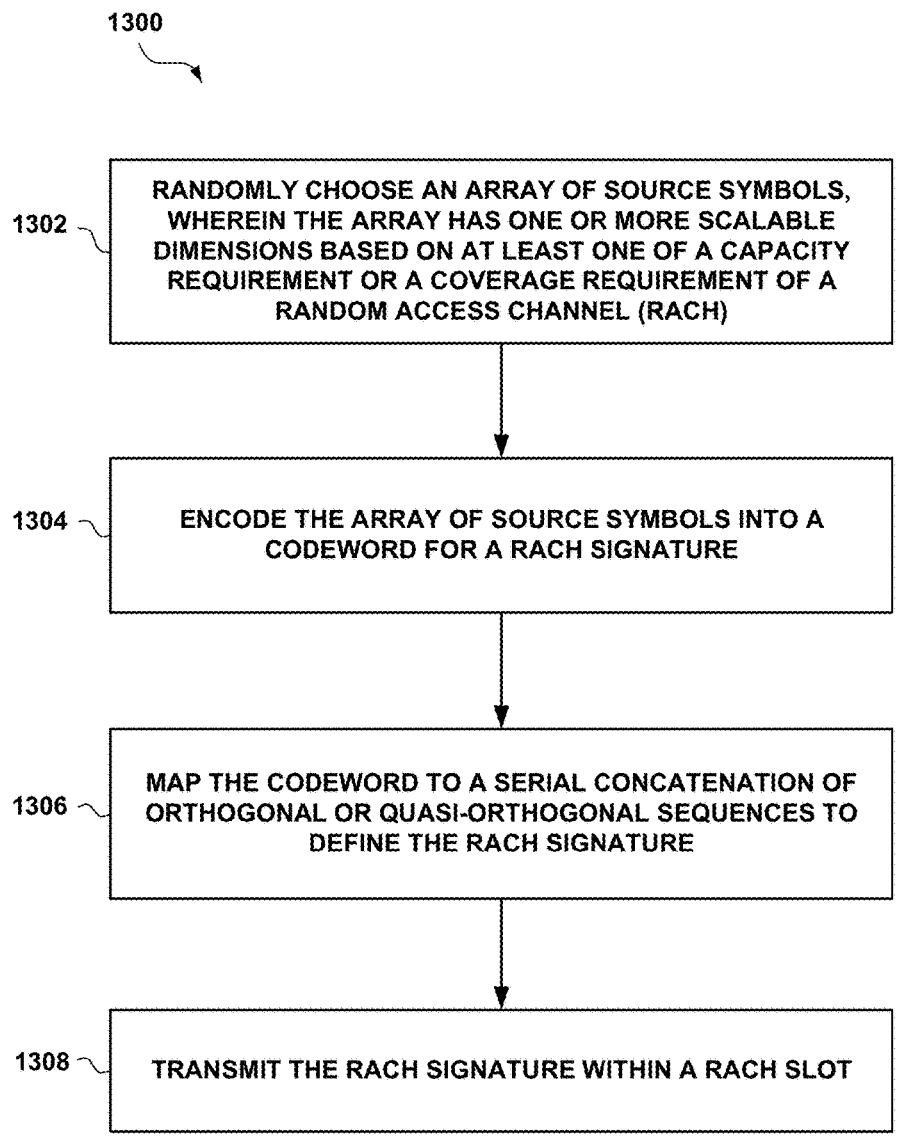
FIG. 13 is a flow diagram of an example method of random access signaling and RACH signal transmission based on scalable signature design, according to one or more of the presently described aspects.

Referring to FIG. 13, in an operational aspect, a UE such as UE 12 and/or UE 14 (FIG. 1) may perform one or more aspects of a method 1300 for random access based on scalable signature design in a wireless communications system. For example, one or more of the processors 103, the memory 130, the modem 108, the RACH management component 40, the RACH capacity and coverage management component 42, and/or the RACH signature component 44, may be configured to perform one or more aspects of the method 1300.

In an aspect, at block 1302, the method 1300 may include randomly choosing an array of source symbols (e.g., non-binary symbols), wherein the array has one or more scalable dimensions based on at least one of a capacity requirement or a coverage requirement of a RACH. In an aspect, for example, the RACH management component 40 and/or RACH capacity and coverage management component 42 (FIG. 1) may identify the capacity of the RACH, and the RACH signature component 44 (FIG. 1) may randomly choose an array of source symbols as described herein. For example, the array of source symbols (e.g., systematic part of encoded, non-binary symbols) may include an alphabet of finite size symbols used to generate a RACH signature for RACH transmissions. In some examples, RACH requests from different UEs may be distinguished by the use of different source symbols. In some examples, the dimension of the array of source symbols and size of alphabet may depend on the desired capacity of random access (e.g., the number of users to use RACH transmissions). In some implementations, the structure of the source symbols or the RACH symbols may be based on OFDM with a configurable resource mapping. In some examples, the one or more scalable dimensions may include at least one of a length of a cyclic prefix, a length of the codeword, a length of a guard time, a size of a codebook, a time duration of the RACH signature, and/or a transmit power.

In an aspect, at block 1304, the method 1300 may include encoding the array of source symbols into a codeword for a RACH signature. In an aspect, for example, the RACH signature component 44 and/or the encoding/decoding component 46 (FIG. 1) may perform encoding the array of source symbols into a codeword for the RACH signature as described herein. In an example, each RACH signature may be a codeword with a number of non-binary symbols, which is generated by encoding the array of source symbols at an FEC encoder (e.g., a MDS, erasure resilient, and short-length FEC encoder, as shown in FIG. 8), and the non-binary symbols may include source symbols and parity symbols (e.g., as shown in FIG. 9 and FIG. 10). In some cases, the codeword may be a short-length codeword that is chosen from block codes with an MDS property. In an implementation, the length of the codeword may be determined or selected based on a coverage distance of a base station (e.g., the network entity 20 in FIGS. 1, 11, and 12) to which the RACH signature is transmitted.

In an aspect, at block 1306, the method 1300 may include mapping the codeword to a serial concatenation of orthogonal or quasi-orthogonal sequences to define the RACH signature. In an aspect, for example, the RACH signature component 44 and/or the mapping component 48 (FIG. 1) may perform mapping the codeword to a serial concatenation of orthogonal or quasi-orthogonal sequences to define the RACH signature as described herein. In an example, the codeword may be mapped based on a symbol index and/or a cell ID, and represented by a sequence of orthogonal or quasi-orthogonal waveforms, for example, a Chu sequence with different cyclic shifts, a chirp sequence with different patterns, a PN sequence, or Walsh codes (e.g., as shown in FIG. 8). In an aspect, the orthogonal sequences may be finite-size Zadoff-Chu sequences with a symbol-specific root index and different cyclic shifts. For example, each code symbol may be mapped to one out of a finite-size of orthogonal sequences, e.g., Zadoff-Chu sequences with a same root index and different cyclic shifts (e.g., as shown in table 700 of FIG. 7). In some implementations, a same root index is used for a same symbol, and different symbols may use different root index to resolve the potential timing ambiguity resulted from near-far effects. In some aspects, the codeword may be mapped symbol-by-symbol to the serial concatenation of orthogonal or quasi-orthogonal sequences, and the symbol-to-sequence mapping may be based on a function of a symbol index (e.g., in FIG. 7) and/or a cell ID.

In an aspect, at block 1308, the method 1300 may include transmitting the RACH signature within a RACH slot. In an aspect, for example, the RACH management component 40 and/or the RACH signature component 44 (FIG. 1) may initiate the RACH signature transmission, e.g., via modem 108, transceiver 106, RF front end 104, and one or more antennas 102, as described herein. In some examples, the RACH signature is transmitted at a pre-determined power level within one RACH slot.

Figure 14:
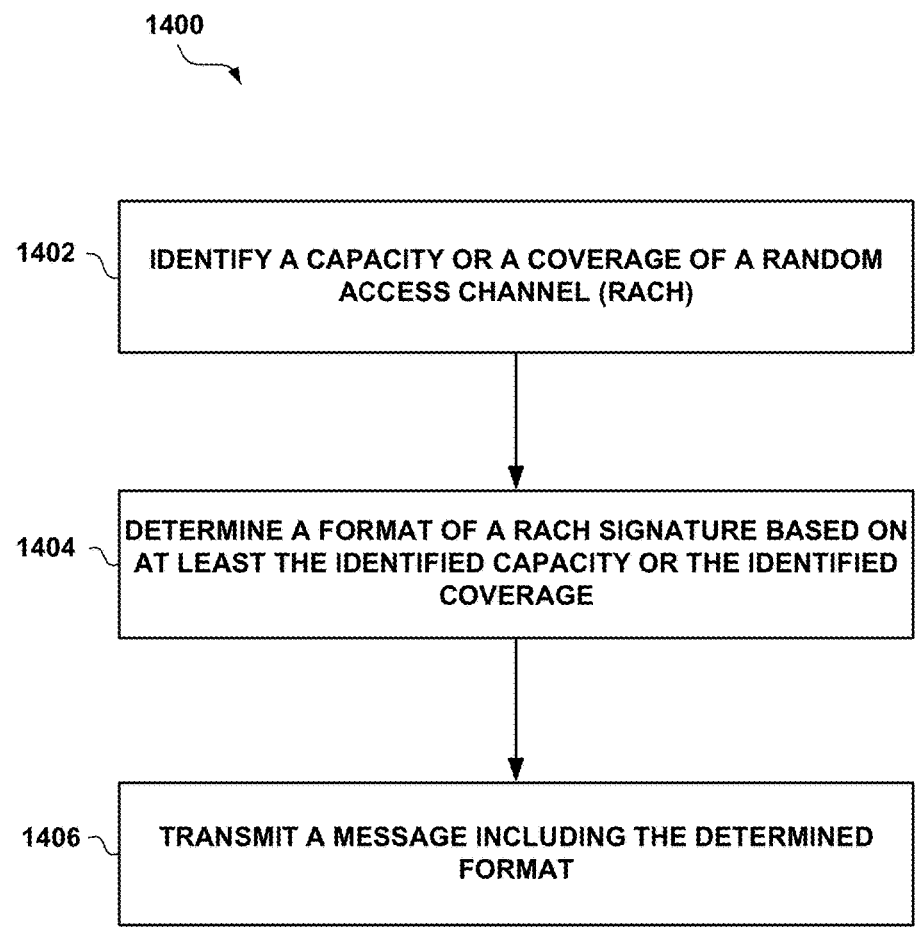
FIG. 14 is a flow diagram of another example method of random access signaling based on scalable signature design, according to one or more of the presently described aspects.

Referring to FIG. 14, in an operational aspect, a network entity such as network entity 20 (FIG. 1) may perform one or more aspects of a method 1400 for random access management and operations. For example, one or more of the processors 103, the memory 130, the modem 108, the RACH management component 40, the RACH capacity and coverage management component 42, and/or the RACH signature component 44, may be configured to perform one or more aspects of the method 1400.

In an aspect, at block 1402, the method 1400 may include identifying a capacity or a coverage of a RACH. In an aspect, for example, the RACH management component 40 and/or RACH capacity and coverage management component 42 (FIG. 1) may identify or determine the capacity or the coverage of a RACH as described herein.

In an aspect, at block 1404, the method 1400 may include determining a format of a RACH signature based on at least the identified capacity or the identified coverage. In an aspect, for example, the RACH management component 40 and/or the RACH signature component 44 (FIG. 1) may determine the format of the RACH signature as described herein.

In an aspect, at block 1406, the method 1400 may include transmitting a message including the determined format. In an aspect, for example, the RACH management component 40 and/or the RACH signature component 44 (FIG. 1) may initiate the message/format transmission, e.g., via modem 108, transceiver 106, RF front end 104, and/or one or more antennas 102, as described herein.

Figure 15:
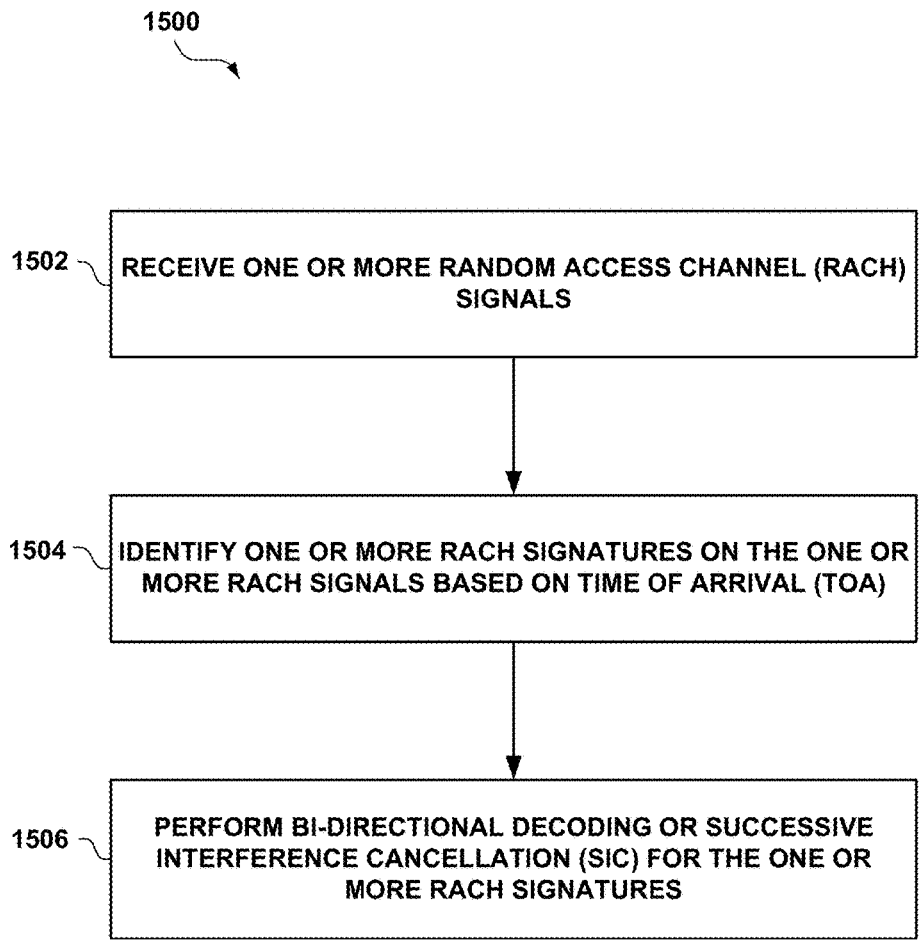
FIG. 15 is a flow diagram of another example method of random access signal reception based on scalable signature design, according to one or more of the presently described aspects.

Referring to FIG. 15, in an operational aspect, a network entity 20 (FIG. 1) may perform one or more aspects of a method 1500 for random access management and operations. For example, one or more of the processors 103, the memory 130, the modem 108, the RACH management component 40, the RACH capacity and coverage management component 42, and/or the RACH signature component 44, may be configured to perform one or more aspects of the method 1500.

In an aspect, at block 1502, the method 1500 may include receiving one or more RACH signals. In an aspect, for example, the RACH management component 40 may receive one or more RACH signals, e.g., via one or more antennas 102, RF front end 104, transceiver 106, and modem 108, as described herein.

In an aspect, at block 1504, the method 1500 may include identifying one or more RACH signatures on the one or more RACH signals based on time of arrival (ToA). In an aspect, for example, the RACH management component 40 and/or the RACH signature component 44 (FIG. 1) may perform the RACH signatures detections, and identify one or more RACH signatures as described herein.

In an aspect, at block 1506, the method 1500 may include performing bi-directional decoding or successive interference cancellation (SIC) for the one or more RACH signatures. In an aspect, for example, the RACH management component 40 and/or the RACH signature component 44 (FIG. 1) may perform bi-directional decoding or SIC for each RACH signature as described herein.

Several aspects of a telecommunications system have been presented with reference to an LTE/LTE-A or a 5G NR communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications, comprising:
   randomly choosing an array of source symbols, wherein the array has one or more scalable dimensions based on at least one of a capacity requirement or a coverage requirement of a random access channel (RACH);
   encoding the array of source symbols into a codeword for a RACH signature;
   mapping the codeword to a serial concatenation of orthogonal or quasi-orthogonal sequences to define the RACH signature; and
   transmitting the RACH signature within a RACH slot.

2. The method of claim 1, wherein mapping the codeword comprises mapping the codeword symbol-by-symbol to the serial concatenation of orthogonal or quasi-orthogonal sequences, and wherein the mapping is a symbol-to-sequence mapping based on a function of at least one of a symbol index or a cell identifier (ID).

3. The method of claim 1, wherein the one or more scalable dimensions include at least one of a length of a cyclic prefix, a length of the codeword, a length of a guard time, a size of a codebook, a code rate, a time duration the RACH signature, and/or a transmit power.

4. The method of claim 1, wherein randomly choosing the array of source symbols comprises randomly choosing the array of source symbols from an alphabet of finite size.

5. The method of claim 1, wherein mapping the codeword to the serial concatenation of orthogonal sequences includes symbol-specific mapping to finite-size Zadoff-Chu sequences with a same root index and different cyclic shifts.

6. The method of claim 1, wherein encoding the array of source symbols into the codeword includes encoding into a short-length codeword chosen from block codes with a maximum distance separable (MDS) property.

7. The method of claim 1, wherein encoding the array of source symbols into the codeword includes using a forward error correction (FEC) encoder to generate the codeword having non-binary symbols, wherein the non-binary symbols include the array of source symbols and parity symbols.

8. The method of claim 1, wherein encoding the array of source symbols into the codeword includes encoding the codeword with a length that depends on a coverage distance of a base station to which the RACH signature is transmitted.

9. The method of claim 1, wherein the array of source symbols are based on orthogonal frequency division multiplexing (OFDM) with a configurable resource mapping.

10. An apparatus for wireless communications, comprising:
    a transmitter;
    a memory configured to store instructions; and
    at least one processor communicatively coupled to the transmitter and the memory, wherein the at least one processor is configured to execute the instructions to:
       randomly choose an array of source symbols, wherein the array has one or more scalable dimensions based on at least one of a capacity requirement or a coverage requirement of a random access channel (RACH);
       encode the array of source symbols into a codeword for a RACH signature;
       map the codeword to a serial concatenation of orthogonal or quasi-orthogonal sequences to define the RACH signature; and
       transmit, via the transmitter, the RACH signature within a RACH slot.

11. The apparatus of claim 10, wherein the codeword is mapped symbol-by-symbol to the serial concatenation of orthogonal or quasi-orthogonal sequences, and wherein the mapping is a symbol-to-sequence mapping based on a function of at least one of a symbol index or a cell identifier (ID).

12. The apparatus of claim 10, wherein the one or more scalable dimensions include at least one of a length of a cyclic prefix, a length of the codeword, a length of a guard time, a size of a codebook, a time duration the RACH signature, and/or a transmit power.

13. The apparatus of claim 10, wherein the at least one processor is configured to execute the instructions to randomly choose the array of source symbols from an alphabet of finite size.

14. The apparatus of claim 10, wherein the orthogonal sequences are finite-size Zadoff-Chu sequences with a symbol-specific root index and different cyclic shifts.

15. The apparatus of claim 10, wherein the codeword is a short-length codeword chosen from block codes with a maximum distance separable (MDS) property.

16. The apparatus of claim 10, wherein the codeword comprises non-binary symbols generated by a forward error correction (FEC) encoder, wherein the non-binary symbols include the array of source symbols and parity symbols.

17. The apparatus of claim 10, wherein a length of the codeword depends on a coverage distance of a base station to which the RACH signature is transmitted.

18. The apparatus of claim 10, wherein the array of source symbols are based on orthogonal frequency division multiplexing (OFDM) with a configurable resource mapping.

19. An apparatus for wireless communications, comprising:
   means for randomly choosing an array of source symbols, wherein the array has one or more scalable dimensions based on at least one of a capacity requirement or a coverage requirement of a random access channel (RACH);
   means for encoding the array of source symbols into a codeword for a RACH signature;
   means for mapping the codeword to a serial concatenation of orthogonal or quasi-orthogonal sequences to define the RACH signature; and
   means for transmitting the RACH signature within a RACH slot.

20. The apparatus of claim 19, wherein the means for mapping maps the codeword symbol-by-symbol to the serial concatenation of orthogonal or quasi-orthogonal sequences, and wherein the means for mapping performs a symbol-to-sequence mapping based on a function of at least one of a symbol index or a cell identifier (ID).

21. The apparatus of claim 19, wherein the one or more scalable dimensions include at least one of a length of a cyclic prefix, a length of the codeword, a length of a guard time, a size of a codebook, a time duration the RACH signature, and/or a transmit power.

22. The apparatus of claim 19, wherein the means for randomly choosing the array of source symbols comprises means for randomly choosing the array of source symbols from an alphabet of finite size.

23. The apparatus of claim 19, wherein the orthogonal sequences are finite-size Zadoff-Chu sequences with a symbol-specific root index and different cyclic shifts.

24. The apparatus of claim 19, wherein the codeword is a short-length codeword chosen from block codes with a maximum distance separable (MDS) property.

25. The apparatus of claim 19, wherein the codeword comprises non-binary symbols, wherein the non-binary symbols include the array of source symbols and parity symbols.

26. A computer-readable medium storing code executable by at least one processor for wireless communications, comprising:
   code executable to randomly choose an array of source symbols, wherein the array has one or more scalable dimensions based on at least one of a capacity requirement or a coverage requirement of a random access channel (RACH);
   code executable to encode the array of source symbols into a codeword for a RACH signature;
   code executable to map the codeword to a serial concatenation of orthogonal or quasi-orthogonal sequences to define the RACH signature; and
   code executable to transmit, via a transmitter, the RACH signature within a RACH slot.

27. The computer-readable medium of claim 26, wherein the codeword is mapped symbol-by-symbol to the serial concatenation of orthogonal or quasi-orthogonal sequences, and wherein the mapping is a symbol-to-sequence mapping based on a function of at least one of a symbol index or a cell identifier (ID).

28. The computer-readable medium of claim 26, wherein the one or more scalable dimensions include at least one of a length of a cyclic prefix, a length of the codeword, a length of a guard time, a size of a codebook, a time duration the RACH signature, and/or a transmit power.

29. The computer-readable medium of claim 26, wherein the orthogonal sequences are finite-size Zadoff-Chu sequences with a symbol-specific root index and different cyclic shifts.

30. The computer-readable medium of claim 26, wherein the codeword is a short-length codeword chosen from block codes with a maximum distance separable (MDS) property.

* * * * *